(12) United States Patent
Sercombe et al.

(10) Patent No.: US 12,191,722 B2
(45) Date of Patent: Jan. 7, 2025

(54) HIGH-TORQUE ELECTRIC MOTOR ASSEMBLY

(71) Applicant: MagniX USA, Inc., Redmond, WA (US)

(72) Inventors: David Sercombe, Arundel (AU); Michele D'Ercole, Arundel (AU); Roei Ganzarski, Redmond, WA (US)

(73) Assignee: MAGNIX USA, INC., Redmond, WA (US)

( * ) Notice: Subject to any disclaimer, the term of this patent is extended or adjusted under 35 U.S.C. 154(b) by 344 days.

(21) Appl. No.: 16/888,824

(22) Filed: May 31, 2020

(65) Prior Publication Data

US 2020/0381984 A1 Dec. 3, 2020

Related U.S. Application Data

(60) Provisional application No. 62/855,143, filed on May 31, 2019, provisional application No. 62/855,147, (Continued)

(51) Int. Cl.
*H02K 16/00* (2006.01)
*B64D 27/24* (2006.01)
(Continued)

(52) U.S. Cl.
CPC ............. *H02K 16/00* (2013.01); *B64D 27/24* (2013.01); *B64D 31/02* (2013.01); *B64D 33/08* (2013.01);
(Continued)

(58) Field of Classification Search
CPC .......... H02K 16/00; H02K 1/21; H02K 7/116; H02K 9/19
(Continued)

(56) References Cited

U.S. PATENT DOCUMENTS 2,635,699 A * 4/1953 Richmond ............ B64C 11/303
416/61
3,781,616 A 12/1973 Mokrytzki et al.
(Continued)

FOREIGN PATENT DOCUMENTS

CN 101771267 A 7/2010
CN 202307414 U 7/2012
(Continued)

OTHER PUBLICATIONS

Search Report from the United Kingdom Patent Office dated Oct. 29, 2020, received in a corresponding foreign application, 9 pages.
(Continued)

*Primary Examiner* — Jose A Gonzalez Quinones
(74) *Attorney, Agent, or Firm* — Scully, Scott, Murphy & Presser, P.C.

(57) ABSTRACT

An electric motor assembly to supply torque is disclosed where the assembly includes a stator modules having a plurality of stator windings, each stator winding configured to receive high-voltage, alternating current; a rotor assembly, each rotor assembly having a hub and plurality of magnets arranged on the hub, the plurality of magnets each having magnetic north and south poles where the plurality of magnets are arranged along an outer periphery of the hub to alternate the magnetic north and south poles; and a main shaft to supply the torque, wherein at least one of the one or more rotor assemblies is configured to rotate the main shaft, and the at least one of the one or more rotor assemblies is associated with and concentrically contained within the one or more stator modules, the at least one of the one or more rotor assemblies being rotatable relative to the one or more stator modules.

33 Claims, 8 Drawing Sheets

Related U.S. Application Data filed on May 31, 2019, provisional application No. 62/855,151, filed on May 31, 2019.

(51) Int. Cl.

| | | |
|---|---|---|
| *B64D 31/02* | (2006.01) | |
| *B64D 33/08* | (2006.01) | |
| *B64D 41/00* | (2006.01) | |
| *F16H 57/04* | (2010.01) | |
| *H02J 7/34* | (2006.01) | |
| *H02K 5/20* | (2006.01) | |
| *H02K 5/22* | (2006.01) | |
| *H02K 7/116* | (2006.01) | |
| *H02K 9/197* | (2006.01) | |
| *H02K 11/21* | (2016.01) | |
| *H02K 11/30* | (2016.01) | |
| *H02P 6/10* | (2006.01) | |
| *H02P 25/16* | (2006.01) | |
| *H02P 27/08* | (2006.01) | |

(52) U.S. Cl.
CPC ......... *B64D 41/00* (2013.01); *F16H 57/0476* (2013.01); *H02J 7/345* (2013.01); *H02K 5/203* (2021.01); *H02K 5/225* (2013.01); *H02K 7/116* (2013.01); *H02K 9/197* (2013.01); *H02K 11/21* (2016.01); *H02K 11/30* (2016.01); *H02P 6/10* (2013.01); *H02P 25/16* (2013.01); *H02P 27/08* (2013.01); *B64D 2221/00* (2013.01); *H02K 2213/06* (2013.01)

(58) Field of Classification Search
USPC ........ 310/54, 112, 114, 149, 156.01, 156.31, 310/184, 262
See application file for complete search history.

(56) References Cited

U.S. PATENT DOCUMENTS

| | | | |
|---|---|---|---|
| 4,418,777 A | 12/1983 | Stockton | |
| 4,743,828 A | 5/1988 | Jahns et al. | |
| 5,982,067 A | 11/1999 | Sebastian et al. | |
| 7,053,508 B2 | 5/2006 | Kusase et al. | |
| 7,462,968 B2 | 12/2008 | Kusase et al. | |
| 7,990,011 B2 | 8/2011 | Yoshino et al. | |
| 8,405,479 B1 | 3/2013 | Cleveland | |
| 8,575,880 B2 | 11/2013 | Grantz | |
| 8,653,710 B2 | 2/2014 | Takahashi et al. | |
| 8,786,156 B2 | 7/2014 | Hino et al. | |
| 8,842,452 B2 | 9/2014 | Nielsen | |
| 9,221,326 B2 | 12/2015 | Steffen et al. | |
| 9,236,775 B2 | 1/2016 | Takahashi et al. | |
| 9,270,154 B2 | 2/2016 | Hibbs et al. | |
| 9,450,461 B2 | 9/2016 | Labbe et al. | |
| 9,479,037 B2 | 10/2016 | Bailey et al. | |
| 9,559,554 B2 | 1/2017 | Gasparin et al. | |
| 9,595,705 B1 | 3/2017 | Buckhout | |
| 9,755,463 B2 | 9/2017 | Klassen et al. | |
| 9,853,588 B2 | 12/2017 | Green et al. | |
| 9,943,016 B2 | 4/2018 | Pietrantonio et al. | |
| 10,008,912 B2 | 6/2018 | Davey et al. | |
| 10,123,450 B2 | 11/2018 | Sarti | |
| 10,272,767 B1* | 4/2019 | Tang .................. | H02K 9/19 |
| 10,326,344 B2 | 6/2019 | Hamann et al. | |
| 10,660,196 B2 | 5/2020 | Amaducci et al. | |
| 2004/0111869 A1 | 6/2004 | Mikkelsen | |
| 2007/0176499 A1* | 8/2007 | Holmes .................. | H02K 3/24 |
| | | | 310/58 |
| 2008/0019062 A1* | 1/2008 | Dooley ................ | H02P 29/032 |
| | | | 361/23 |
| 2009/0195090 A1 | 8/2009 | Rittenhouse | |
| 2010/0038473 A1* | 2/2010 | Schneider ............ | F16F 15/134 |
| | | | 184/6.12 |
| 2010/0046129 A1 | 2/2010 | Mikrut | |
| 2010/0097169 A1 | 4/2010 | Earle | |
| 2011/0024567 A1 | 2/2011 | Blackwelder et al. | |
| 2011/0133580 A1 | 6/2011 | Sugimoto et al. | |
| 2011/0138765 A1 | 6/2011 | Lugg | |
| 2012/0025032 A1 | 2/2012 | Hopdjanian et al. | |
| 2012/0055727 A1 | 3/2012 | Omiya et al. | |
| 2012/0126731 A1 | 5/2012 | Wyrembra | |
| 2012/0153718 A1 | 6/2012 | Rawlinson et al. | |
| 2012/0194040 A1 | 8/2012 | Hao et al. | |
| 2012/0257429 A1 | 10/2012 | Dong et al. | |
| 2012/0262019 A1 | 10/2012 | Smith et al. | |
| 2013/0285485 A1 | 10/2013 | Song et al. | |
| 2014/0022681 A1 | 1/2014 | Mitsutani | |
| 2014/0042948 A1 | 2/2014 | Green et al. | |
| 2014/0056726 A1 | 2/2014 | Garrard et al. | |
| 2014/0070634 A1* | 3/2014 | Legros .................. | H02K 1/28 |
| | | | 310/156.31 |
| 2014/0139161 A1 | 5/2014 | Ueda | |
| 2014/0167548 A1 | 6/2014 | Kong | |
| 2014/0191613 A1 | 7/2014 | Mariotto | |
| 2014/0361646 A1 | 11/2014 | Saito et al. | |
| 2015/0018168 A1 | 1/2015 | Davey et al. | |
| 2015/0061440 A1 | 3/2015 | Catalan | |
| 2015/0091486 A1 | 4/2015 | Chandrasekharan et al. | |
| 2015/0093272 A1 | 4/2015 | Kömer et al. | |
| 2015/0180296 A1* | 6/2015 | Ravaud .................. | H02K 1/278 |
| | | | 310/85 |
| 2015/0270735 A1 | 9/2015 | Smith | |
| 2015/0318745 A1* | 11/2015 | Matsuoka ............ | H02K 1/2773 |
| | | | 310/156.56 |
| 2015/0326166 A1 | 11/2015 | Hayashi | |
| 2016/0045841 A1 | 2/2016 | Kaplan et al. | |
| 2016/0065016 A1 | 3/2016 | Seufert et al. | |
| 2016/0082858 A1 | 3/2016 | Yang et al. | |
| 2016/0105092 A1 | 4/2016 | Takakura et al. | |
| 2016/0107758 A1 | 4/2016 | Esteyne et al. | |
| 2016/0141999 A1 | 5/2016 | Han et al. | |
| 2016/0144725 A1 | 5/2016 | Nozawa | |
| 2016/0258266 A1 | 9/2016 | Frick | |
| 2017/0237383 A1 | 8/2017 | Buffenbarger et al. | |
| 2017/0288286 A1 | 10/2017 | Buckhout et al. | |
| 2018/0145623 A1 | 5/2018 | Xiang et al. | |
| 2018/0236882 A1 | 8/2018 | Wang et al. | |
| 2018/0294760 A1 | 10/2018 | Koenig et al. | |
| 2018/0309349 A1 | 10/2018 | Sigmar | |
| 2018/0323737 A1 | 11/2018 | Masillamani | |
| 2018/0331540 A1 | 11/2018 | Mao et al. | |
| 2018/0342933 A1 | 11/2018 | Tangudu et al. | |
| 2019/0061654 A1 | 2/2019 | Tsuji et al. | |
| 2019/0074625 A1 | 3/2019 | Rhys | |
| 2019/0131851 A1 | 5/2019 | Herb | |
| 2019/0202300 A1 | 7/2019 | Pastor et al. | |
| 2020/0149427 A1 | 5/2020 | Long | |
| 2020/0381985 A1 | 12/2020 | Sercombe et al. | |
| 2021/0366642 A1 | 11/2021 | Herrmann et al. | |

FOREIGN PATENT DOCUMENTS

| | | | | | |
|---|---|---|---|---|---|
| CN | 203463636 U | * | 3/2014 | | |
| CN | 103795203 A | * | 5/2014 | | |
| CN | 1 04052221 A | | 9/2014 | | |
| CN | 104057779 A | | 9/2014 | | |
| CN | 203933369 U | | 11/2014 | | |
| CN | 102530219 B | | 6/2015 | | |
| CN | 102714081 B | * | 11/2015 | ............ | B22F 1/0055 |
| CN | 106374701 A | | 2/2017 | | |
| CN | 206211715 U | | 5/2017 | | |
| CN | 108429370 A | * | 8/2018 | ............. | H02K 1/146 |
| CN | 108781023 A | * | 11/2018 | ............. | B60L 11/14 |
| CN | 109921708 A | | 6/2019 | | |
| CN | 209805612 U | | 12/2019 | | |
| DE | 10240241 A1 | | 3/2004 | | |
| DE | 102013208976 A1 | | 12/2014 | | |
| DE | 102015201960 A1 | * | 8/2016 | | |
| DE | 102016200081 A1 | * | 7/2017 | ............. | H02K 1/32 |
| DE | 102017213543 B4 | | 8/2019 | | |
| DE | 102006037003 B4 | | 3/2023 | | |
| EP | 0522015 B1 | | 8/2000 | | |

(56) References Cited

FOREIGN PATENT DOCUMENTS

| | | | | |
|---|---|---|---|---|
| EP | 1453187 | A2 | 9/2004 | |
| EP | 1860756 | A2 | 11/2007 | |
| EP | 2592726 | A2 * | 5/2013 | ............. H02K 7/116 |
| EP | 2602515 | A1 | 6/2013 | |
| EP | 2774853 | A1 | 9/2014 | |
| EP | 2799322 | B1 | 2/2019 | |
| FR | 3030383 | A1 * | 6/2016 | ............. B60K 11/02 |
| FR | 3036551 | A1 * | 11/2016 | ............. H02K 1/32 |
| GB | 2503671 | A | 1/2014 | |
| JP | 2006-060952 | A | 3/2006 | |
| JP | 2010057290 | A | 3/2010 | |
| JP | 2017147878 | A * | 8/2017 | |
| JP | 2019169499 | A | 10/2019 | |
| KR | 20140050885 | A * | 4/2014 | |
| KR | 20150004259 | A | 1/2015 | |
| KR | 20180042529 | A | 4/2018 | |
| RU | 2015156857 | A | 7/2017 | |
| WO | 2013056083 | A1 | 4/2013 | |
| WO | 2015101870 | A1 | 7/2015 | |
| WO | WO-2018030343 | A1 * | 2/2018 | ............... H02K 5/20 |
| WO | WO-2018137955 | A1 * | 8/2018 | ............... H02K 9/00 |
| WO | WO-2018218314 | A1 * | 12/2018 | ............. H01F 27/08 |
| WO | 2019017495 | A1 | 1/2019 | |
| WO | 2019056095 | A1 | 3/2019 | |
| WO | WO-2019041915 | A1 * | 3/2019 | ............. F04C 23/02 |
| WO | 2020067259 | A1 | 4/2020 | |

OTHER PUBLICATIONS

Search Report from the United Kingdom Patent Office dated Jul. 5, 2022, received in a corresponding foreign application, 9 pages.

Office Action dated Aug. 25, 2022 received in U.S. Appl. No. 16/888,809, 24 pages.

Office Action dated Nov. 17, 2022 received in U.S. Appl. No. 16/889,246, 16 pages.

Search Report issued by the United Kingdom Patent Office dated Apr. 4, 2023 received in a related foreign application, 4 pages.

Search Report issued by the United Kingdom Patent Office dated Jun. 29, 2023 received in a related foreign application, 8 pages.

Office Action dated Jul. 14, 2023 received in U.S. Appl. No. 16/889,246, 18 pages.

Combined Search and Examination Report issued by the United Kingdom Patent Office dated Sep. 18, 2023 received in a related foreign application, 4 pages.

Combined Search and Examination Report issued by the United Kingdom Patent Office dated Oct. 6, 2023 received in a related foreign application, 7 pages.

Office Action dated Jul. 24, 2024 received in U.S. Appl. No. 16/889,246, 23 pages.

Combined Examination and Search Report Mailed Nov. 27, 2020 in GB2008171.7, 10 pages.

Office Action dated Apr. 5, 2024 received in U.S. Appl. No. 16/889,246, 18 pages.

Office Action dated Mar. 3, 2023 received in U.S. Appl. No. 16/889,246, 18 pages.

Combined Examination and Search Report Mailed Nov. 27, 2020 in GB2008178.2.

Search Report dated Oct. 21, 2022 issued by the United Kingdom Patent Office in a corresponding foreign application, GB2008178.2, 5 pages.

United Kingdom Search Report dated Oct. 28, 2022 received in a corresponding foreign application, GB2211540.6, 4 pages.

* cited by examiner

HIGH-TORQUE ELECTRIC MOTOR ASSEMBLY

BACKGROUND

This disclosure relates to electric motors, including high-torque electric motor assemblies, which can have many applications including for example to power propulsion systems for aircraft.

Traditionally, aircraft, including for example, manned fixed wing airplanes, have used gas-powered engines to drive the propulsors to power the aircraft. Gas powered engines for use in aircraft have certain hazards associated with transporting and utilizing the highly combustible fuel that is necessary to power the engines in those systems. Gas powered engines also have exhaust gases that are not environmentally friendly, and have performance characteristics that exhibit large variations at ambient conditions and with increasing altitude. It is desirable to have a power system to provide high-torque to propulsors for aircraft that does not have the disadvantages of gas powered engines, such as, for example, the hazards associated with a highly combustible fuel, the large performance variations and deteriorating performance at high altitudes, and environmentally unfriendly exhaust gases dispensed at high altitudes.

SUMMARY OF THE INVENTION

The summary of the disclosure is given to aid the understanding of an electric motor assembly, an accessory gearbox comprising a governor interface system integrated with the electric motor assembly, and their method of operation preferably to power and control propulsors for manned aircraft, e.g., a fixed wing airplane. The present disclosure is directed to a person of ordinary skill in the art. It should be understood that various aspects and features of the disclosure may advantageously be used separately in some instances, or in combination with other aspects and features of the disclosure in other instances.

An electric motor assembly for providing torque is disclosed, where in an embodiment the electric motor includes one or more stator modules, each stator module having stator windings; one or more rotor assemblies, each rotor assembly having a rotor hub structure and associated permanent magnets mounted to the outer periphery of the rotor hub structure; and a main shaft. Electric motor assemblies having multiple rotor assemblies according to an embodiment mount each rotor assembly on the main shaft laterally side-by-side along the longitudinal axis of the main shaft, and each rotor assembly is associated with and concentrically contained within one or more of the stator modules. Each rotor assembly and corresponding stator module within which the associated rotor assembly rotates forms an independent motor module. The main shaft preferably is rotatably fixed (and preferably laterally fixed) with respect to the one or more rotor assemblies with each rotor assembly being rotatable relative to its associated stator module to provide torque to and rotate the main shaft. In an embodiment, the electric motor assembly has a plurality of electric power connector boxes where each connector box receives independent multiphase, alternating-current (AC), preferably high-voltage, alternating current (HVAC).

In one or more embodiments, an electric motor assembly supplies torque via a rotating shaft to a propulsor of an aircraft having power controls. In an aspect, the electric motor assembly has a main shaft for connection to the propulsor where the electric motor assembly is configured and adapted to receive power as high-voltage, alternating-current (HVAC) from a power supply to rotate the main shaft. The electric motor assembly can provide in an embodiment full torque of about 500 Nm to as high as 3600 Nm even at low revolutions per minute (RPM) of about 1000 to about 3000 RPM without a reduction gearbox, and is not impacted by altitude.

The electric motor assembly can optionally include an accessory gearbox comprising a governor interface system integrated with the electric motor assembly to adjust the pitch of the propulsor element, e.g., the propeller blades. In a further embodiment, the accessory gearbox integrated with the electric motor assembly has additional interfaces or pads providing torque to power one or more auxiliary or accessory systems.

BRIEF DESCRIPTION OF THE DRAWINGS

The various aspects, features, and embodiments of an electric motor assembly, preferably a high-power electric motor assembly, an accessory gearbox having a governor interface system integrated with the electric motor assembly, and their methods of operation will be better understood when read in conjunction with the figures provided. Embodiments are provided in the figures for the purpose of illustrating aspects, features, and various embodiments of the electric motor assembly, the accessory gearbox having a governor interface integrated system, and their operation, but the disclosure should not be limited to the precise arrangement, structures, assemblies, subassemblies, systems, features, aspects, embodiments, methods, processes, devices, or uses shown, and the arrangement, structure, assembly, subassembly, system, features, aspects, embodiments, methods, processes, and devices shown may be used singularly or in combination with other arrangements, structures, assemblies, subassemblies, systems, features, aspects, embodiments, methods, processes, and/or devices.

DETAILED DESCRIPTION

Figure 1:
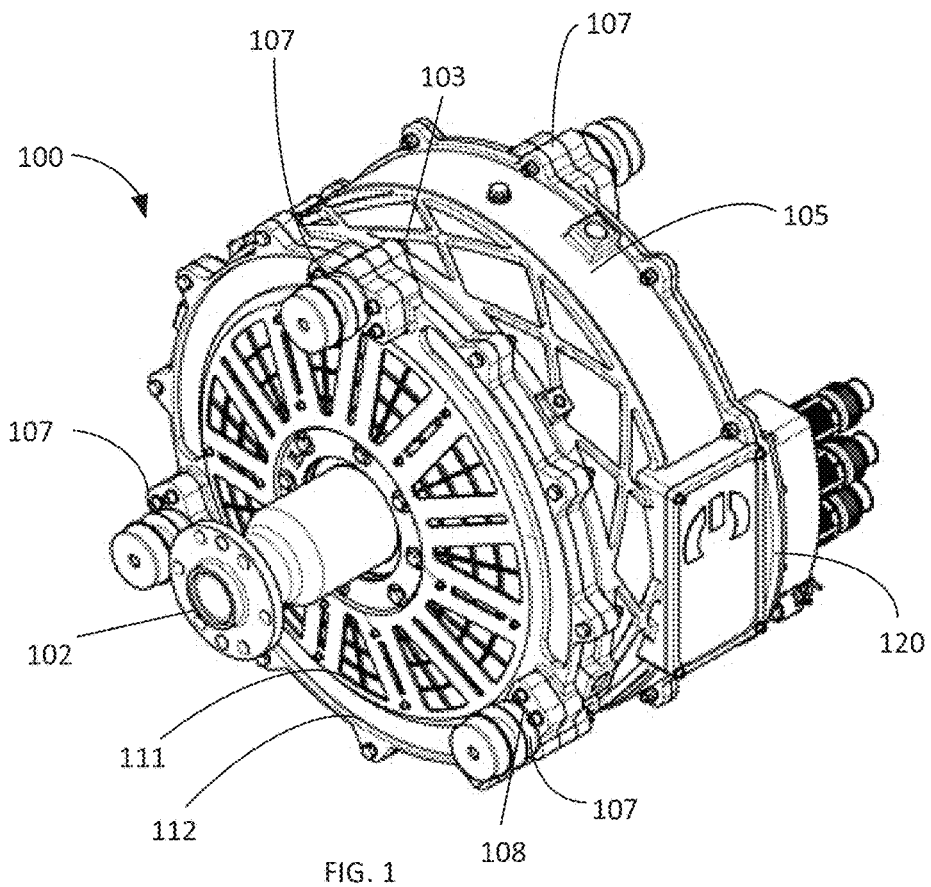
FIG. 1 illustrates a front perspective view of an example of an embodiment of an electric motor assembly.

The following description is made for illustrating the general principles of the invention and is not meant to limit the inventive concepts claimed herein. In the following detailed description, numerous details are set forth in order to provide an understanding of an electric motor assembly, preferably a high-torque electric motor assembly, an accessory gearbox with an integrated governor interface system, their architectural structures, components, and methods of operation, particularly configured for high-load conditions, for example, to rotate a propulsor to power an aircraft, e.g., a manned aircraft, however, it will be understood by those skilled in the art that different and numerous embodiments of the electric motor assembly, the accessory gearbox having governor interface integrated system, their architectural structures, methods of operation, and their uses may be practiced without those specific details, and the claims and invention should not be limited to the arrangements, structures, embodiments, assemblies, subassemblies, mechanisms, structures, features, functional units, circuitry, processes, methods, aspects, features, or details specifically described and shown herein. Further, particular features, mechanisms, assemblies, subassemblies, structures, aspects, functions, circuitry, embodiments, and details described herein can be used in combination with other described features, mechanisms, assemblies, subassemblies, structures, aspects, functions, circuitry, embodiments, and/or details in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It should also be noted that, as used in the specification and the appended claims, the singular forms "a," "an" and "the" include plural referents unless otherwise specified.

Embodiments of an electric motor assembly are disclosed in FIGS. 1-4. The electric motor assembly is particularly adapted to produce high-torque for high-load applications, including but not limited to producing torque to rotate the propulsors of an aircraft. While embodiments of the electric motor assembly are described in the context of providing power for the propulsor of an aircraft, for example a manned airplane, it should be appreciated that the electric motor assembly will have other uses, and further that features described herein can be applied to other applications and electric motor assemblies for other uses.

In one or more embodiments the electric motor assembly is modular to produce different torque levels depending upon the number of motor modules used, and in an aspect the electric motor assembly produces 500 Nm to as high as 3600 Nm of torque. The electric motor assembly in an embodiment produces 500 Nm to as high as 3600 Nm of torque at operating speeds of about 1000 to about 3000 RPM, which can be utilized in an aspect to directly drive a propeller in an electrically propelled aircraft, e.g., a manned airplane. The electric motor assembly in one or more embodiments can produce full torque of about 500-3600 Nm even at low RPM of about 1000-3000 RPM without a reduction gearbox and is not impacted by altitude. The electric motor assembly in an embodiment receives electrical power in the form of multiphase, high-voltage, alternating-current (HVAC) and converts the electrical energy to the mechanical output, e.g., rotational torque, at the main shaft which can be used in an embodiment to drive the main propulsor or propulsors of the aircraft. The HVAC power supplied to the electric motor assembly is converted to mechanical energy that rotates the motor's shaft which drives (rotates) the propulsor of the aircraft.

Figure 2:
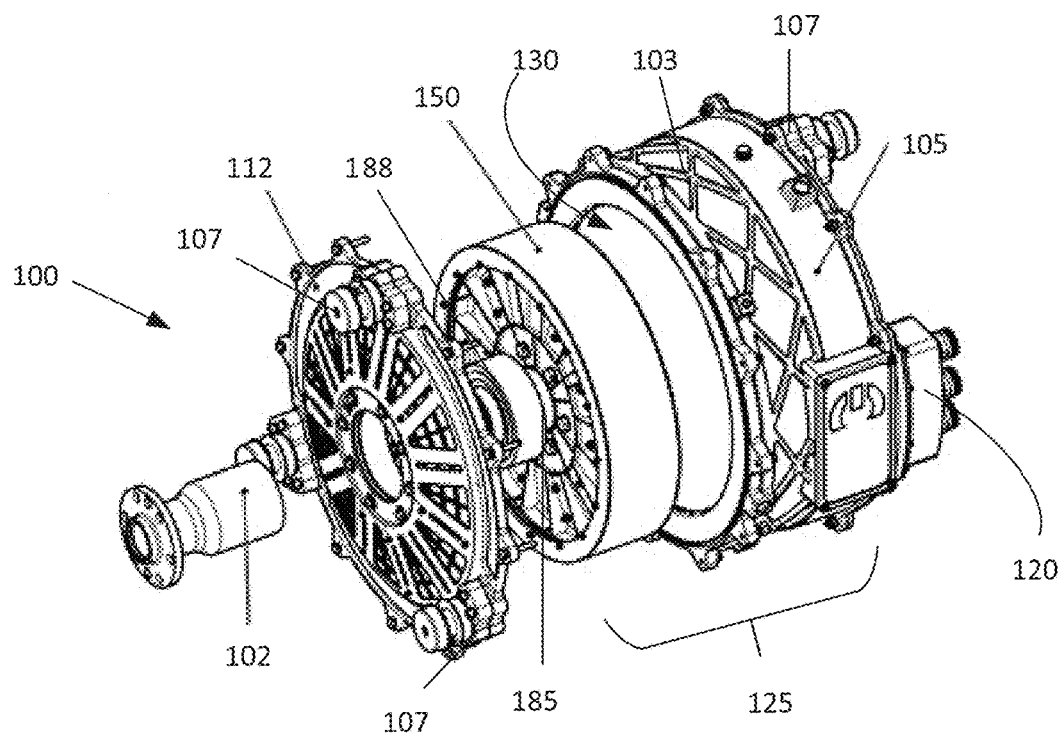
FIG. 2 illustrates a front perspective, exploded view of the electric motor assembly of FIG. 1.

In an embodiment, as shown in FIGS. 1-2, electric motor assembly 100 includes, for example, one stator module 130, one rotor assembly 150, and a common or main shaft 185. The electric motor assembly 100 preferably also includes one or more shaft bearings 188 mounted on the main shaft 185 for supporting the main shaft 185. In an embodiment, the electric motor assembly 100 also includes front filter plate 111 and/or a rear filter plate 113 (shown in FIG. 5). The filter plates 111, 113 preferably prevent debris and the like from entering and interfering with the rotating and moving components and systems in the interior of the electric motor assembly 100.

Figure 3:
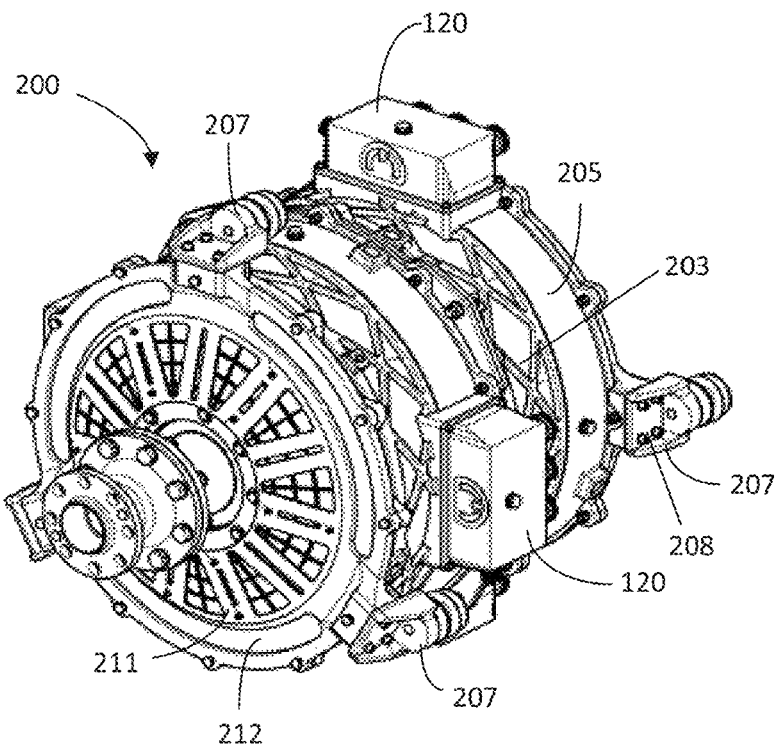
FIG. 3 illustrates a front perspective view of an example of another embodiment of an electric motor assembly.
Figure 4:
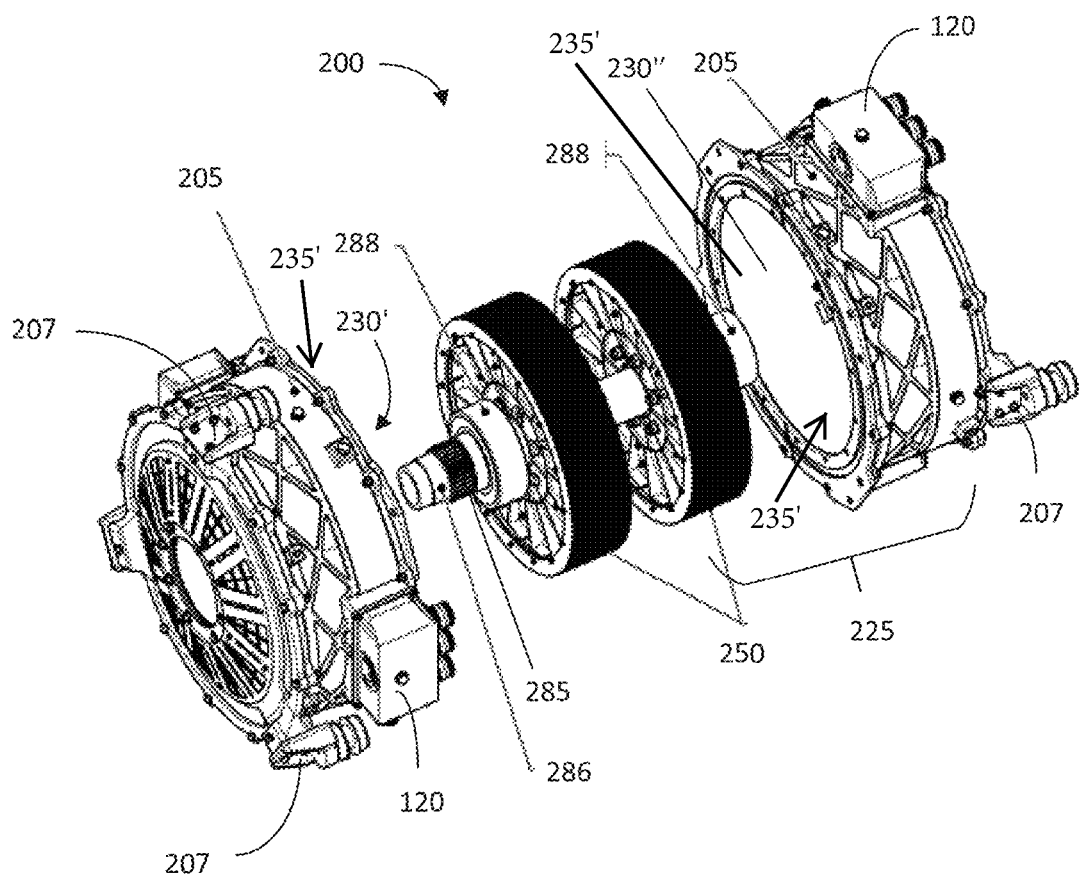
FIG. 4 illustrates a front perspective, exploded view of the electric motor assembly of FIG. 3.
Figure 7:
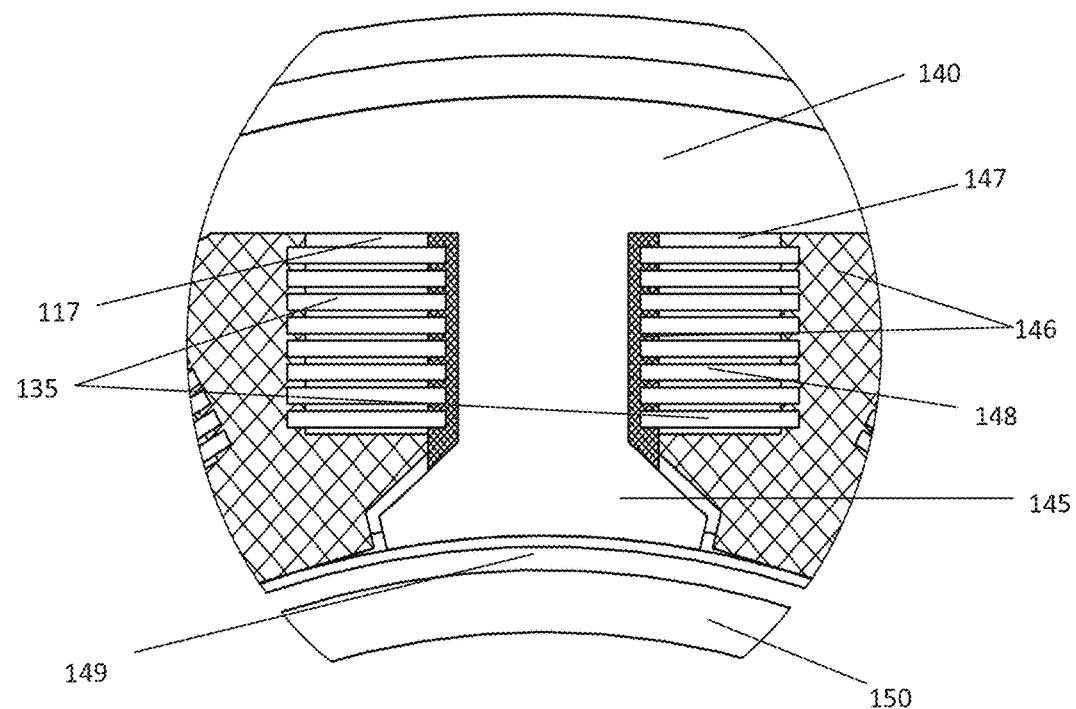
FIG. 7 illustrates a front view of a portion of the stator assembly used in an embodiment of the electric motor assembly.

The electric motor assembly 100 includes a stator module or assembly 130 that contains stator windings 135, stator core 140, insulation 146, stator teeth 145, and the cooling geometry (e.g., channels 117) to remove heat from the stator module 130 as shown in FIG. 7. The stator module 130 surrounds the rotor assembly 150 and the main shaft 185. While the electric motor assembly 100 is shown in FIGS. 1-2 as having one stator module 130, it will be appreciated that more or less stator modules 230 can be provided as shown in FIGS. 3-4.

The outer casing 103 of the stator module 130 forms part of a housing 105 for the electric motor assembly 100 and contains the rotor assembly 150, the main shaft 185, and preferably the one or more shaft bearings 188. The optional front and rear filter plates 111, 113; front and rear thrust plates 112, 114; and stator module 130 (outer casing 103) form a structural housing or outer casing 105 for the electric motor assembly 100. The front and rear thrust plates 112, 114 provide structure to transfer thrust, propeller forces, and moment and torque reactions from the main shaft 185 and bearings 188 to the housing 105. The outer casing or housing 105, in one or more embodiments, has one or more motor mounts 107, preferably replaceable motor mounts, attached thereto. The motor mounts 107 connect the electric motor assembly 100 to the aircraft. The motor mounts 107 preferably are removeably-connected to the housing 105 and can be replaced with motor mounts 107 of different configurations and sizes to permit the electric motor assembly 100 to be mounted in different configurations for different motor bays, e.g., aircraft motor bays. As can be seen, the replaceable motor mounts 107 have plates 108 that are mounted by bolts to different locations on the electric motor housing 105. Forces and moments are transmitted from the motor main shaft 185 to the housing 105, to the motor mounts 107, and to the supporting structure, e.g., aircraft structure. The housing 105 further includes electric power connector boxes 120 to receive incoming electric power. The power supplied to the electric power connector boxes 120 is routed to the stator windings 135 in the stator module 130 as discussed in more detail below.

Figure 8:
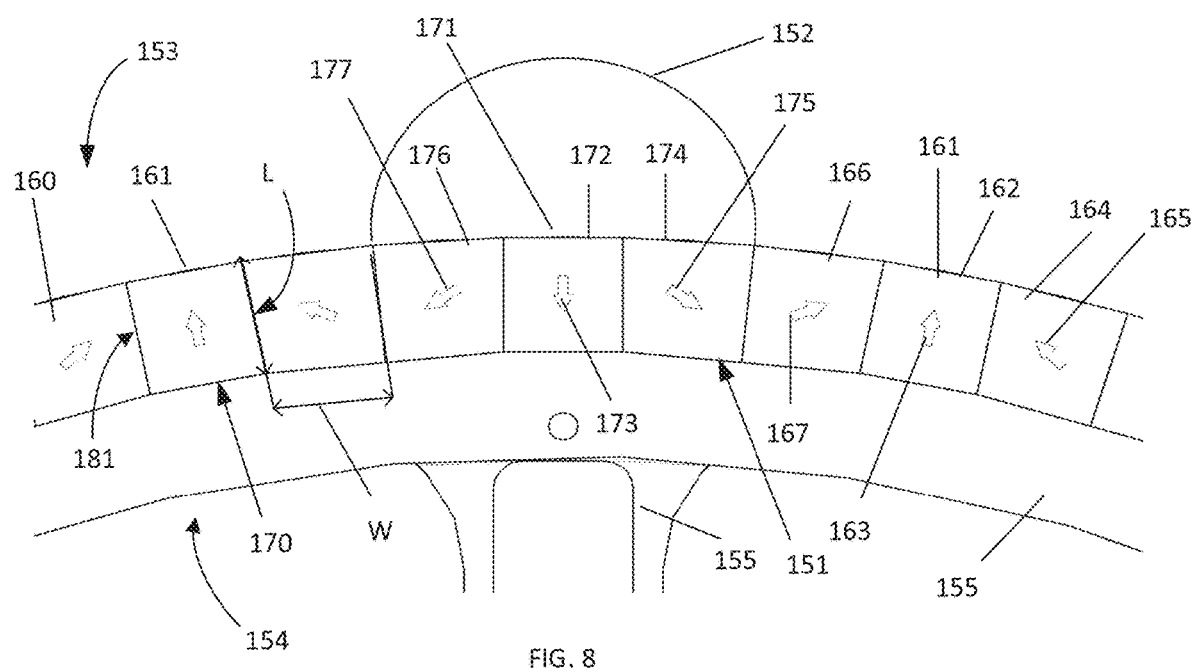
FIG. 8 illustrates a side view of a portion of an embodiment of a rotor assembly.
Figure 9:
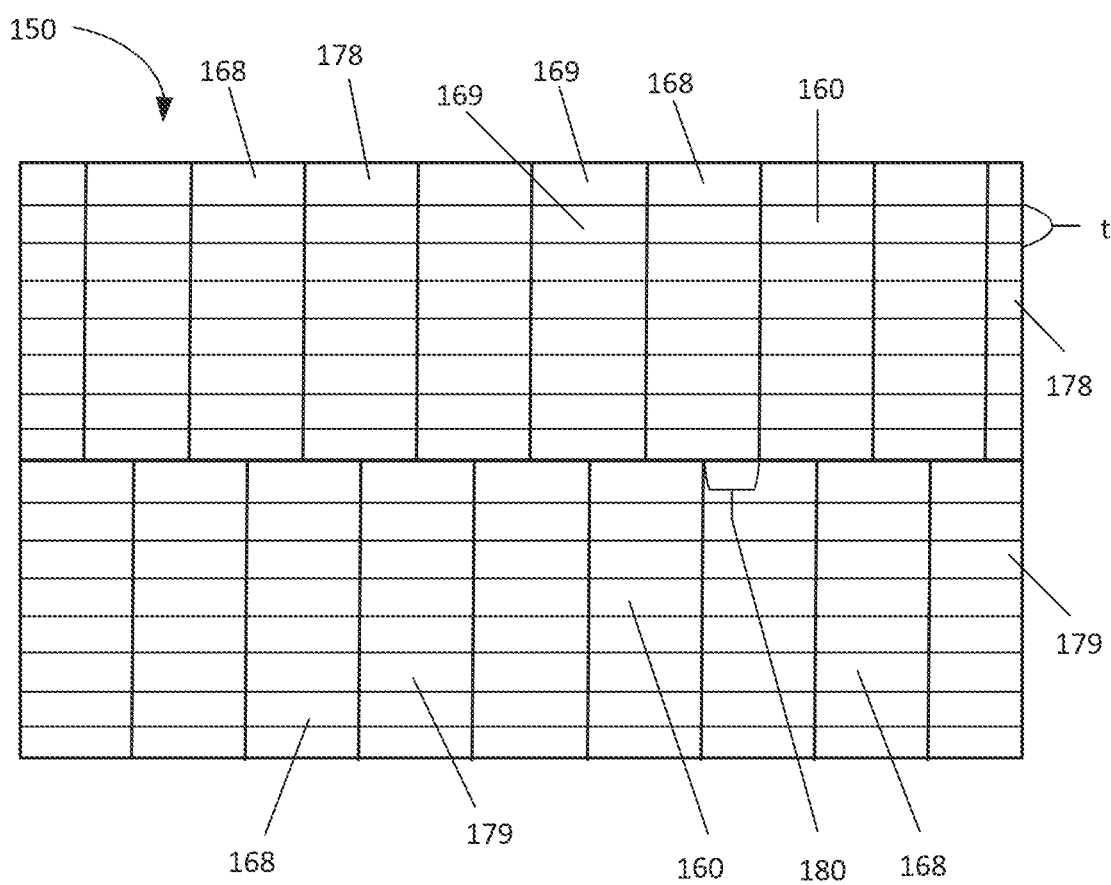
FIG. 9 illustrates a top view of a portion an embodiment of a rotor assembly without the retention band.
Figure 10:
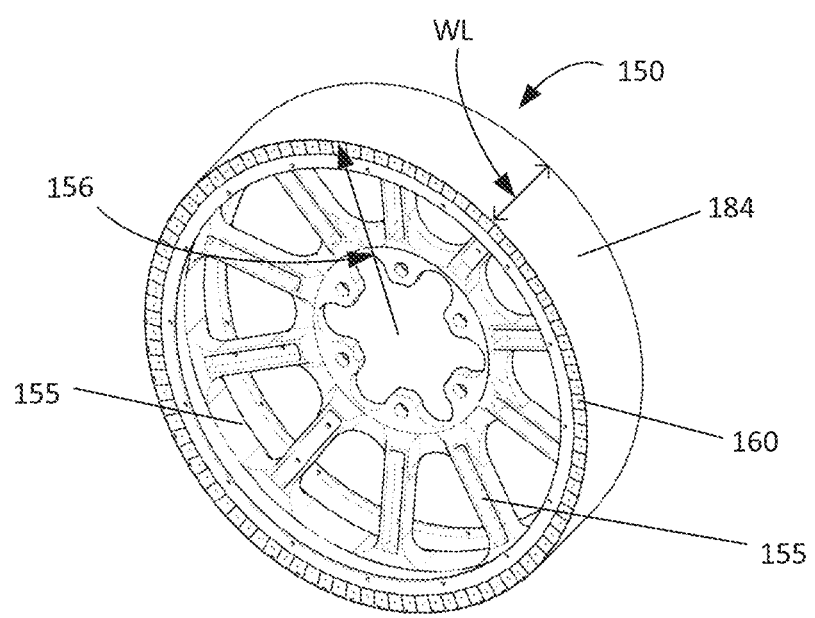
FIG. 10 illustrates a top perspective view of an embodiment of a rotor assembly.

The rotor assembly 150 as shown in FIGS. 8-10 include the supporting rotor structure or rotor hub 155 that has permanent magnets 160 associated with, preferably mounted to, the rotor hub 155, and, in a preferred embodiment, retention banding 184 to facilitate retaining the permanent magnets 160 on the rotor structure/hub 155. It should be clear to a person of ordinary skill in the art that the rotor structure 155 can have magnets 160 mounted on the surface 153 of the rotor hub 155 or interior surface 154 of the rotor hub 155 encased in ferromagnetic material in an arrangement typical of Interior Permanent Magnet (IPM) machines.

Turning back to FIGS. 1-2, the rotor assembly 150, more specifically the rotor hub 155, is preferably non-rotatably attached, e.g., rotatably fixed, to the main shaft 185, either indirectly or directly, so as to rotate the main shaft 185. In a preferred embodiment, the stator module 130 and rotor assembly 150 are located concentrically along the main shaft 185. The rotor assembly 150 is mounted inside and rotates relative to the stator assembly/module 130. The concentric stator module 130 and associated rotor assembly 150 form a motor module 125. The shaft bearings 188 preferably are also mounted about the main shaft 185. In a preferred embodiment, the electric motor assembly 100 is a permanent magnet synchronous machine (PMSM). The torque output of the main shaft 185 is used to drive a propulsor attached to the electric motor assembly 100. The propulsors could be variable or fixed pitch propellers, ducted fans or unducted fans.

Figure 14:
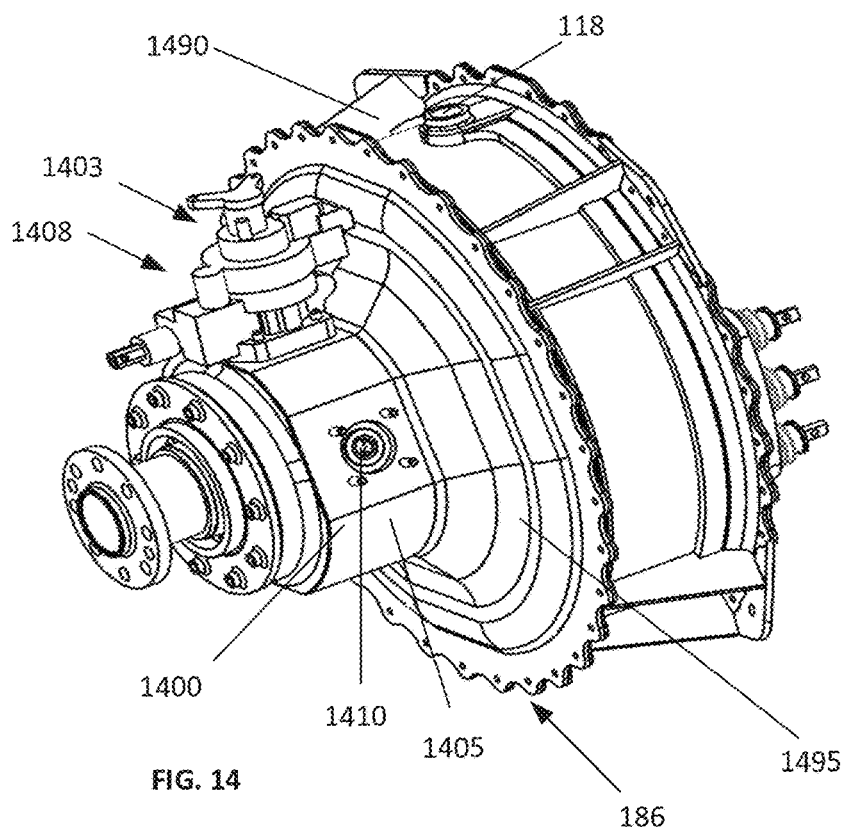
FIG. 14 illustrates a front perspective view of an embodiment of an electric motor assembly and integrated accessory gearbox with a governor interface system.
Figure 15:
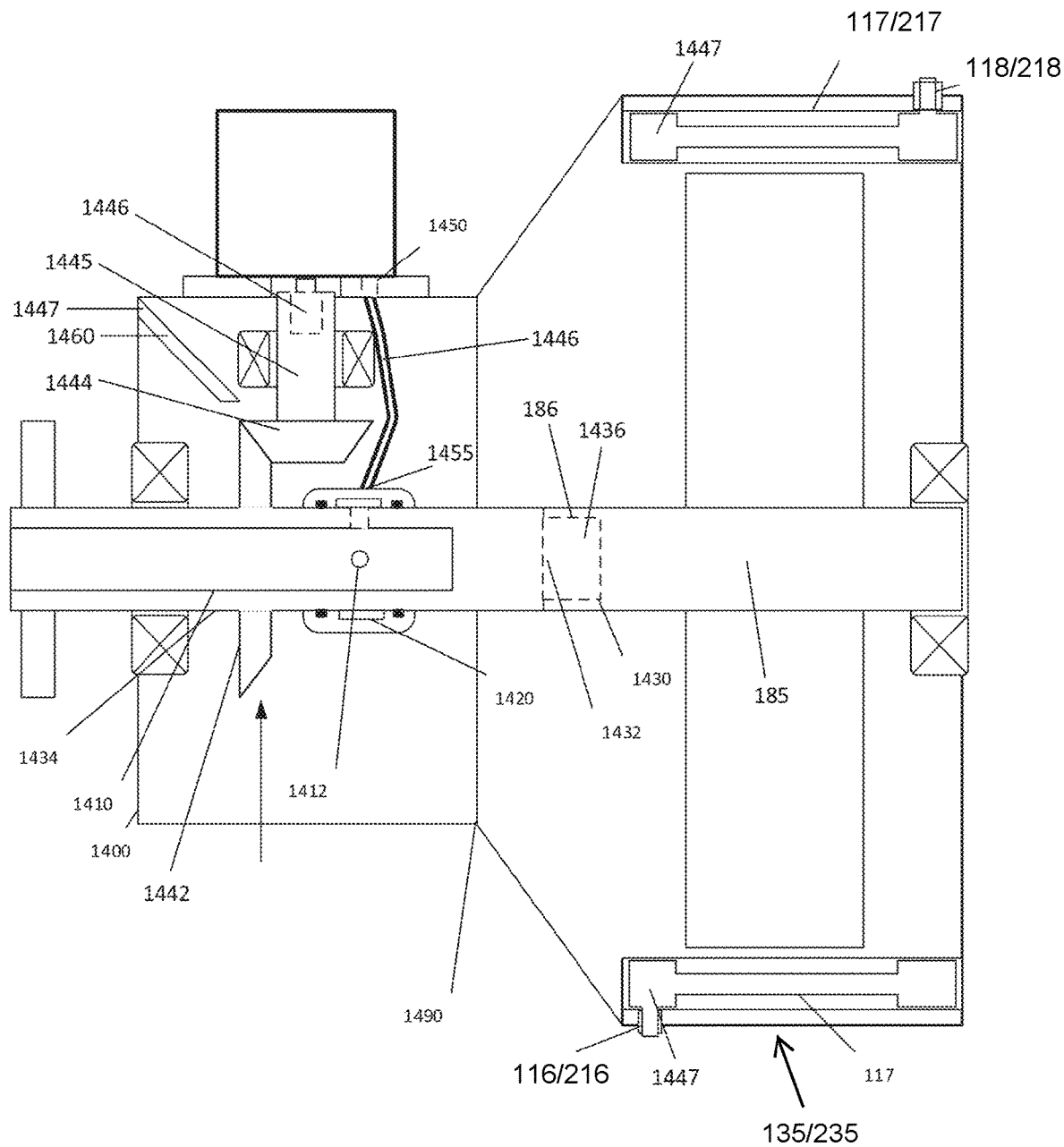
FIG. 15 illustrates a diagrammatical cross-sectional view of the accessory gearbox having integrated governor interface system of FIG. 14.

Each stator module 130 contains one or more fluid inlets 116 (See FIGS. 14-15) through which coolant 147 is introduced to and which travels through the electric motor assembly 100 and one or more cooling outlets 118 by which the heated coolant 147 exits the electric motor assembly 130. Stator module 130 in an embodiment has one or more cooling inlets 116 positioned at the drive end of the stator module (that is the end closest to output shaft 185 of the electric motor assembly 100) and one or more cooling outlets 118 at the opposite end to the drive end along the main shaft 185 of the electric motor assembly 100. The cooling inlets 116 are connected to one or more channels 117 to direct the fluid 147 to flow through the stator windings 135 as shown in FIGS. 7, 14-15. In one or more embodiments the one or more cooling inlets 116, channels 117, and one or more cooling outlets 118 are configured as described and taught in PCT/AU2018/050553 (WO 2018/218314), the entirety of which is incorporated by reference. Each inlet 116, outlet 118, and connecting channel 117 can form an independent cooling path through the electric motor assembly 100, or multiple inlets 116 and outlets 118 can connect and communicate with a common channel 117 though the electric motor assembly 100.

In another embodiment, the electric motor assembly 200 includes multiple motor modules 225 as shown in FIGS. 3 and 4. The modular motor assembly 200 of FIGS. 3-4 show a rear motor module 225' in which the active elements (e.g., stator windings 135 and magnets 160) and structural components are largely identical to the front motor module 225", and each of rear motor module 225' and front motor module 225" are largely identical to the motor module 125 described below and in connection with FIGS. 1-2. The multiple motor modules 225', 225" in one or more embodiments are configured to provide partial power states in the event of a fault. By way of example, the electric motor assembly 200 may have two or more motor modules 225, each motor module 225 containing at least one independent stator winding 235. Providing physical isolation between the stator windings 235 contained within these stator modules 225', 225" in the event that a fault condition arises within motor module 225', preferably isolates the effects of this fault condition to the affected motor module 225', allowing the other motor module 225" (or modules) to continue to deliver power. That is, the motor modules 225', 225" can operate independently of each other such that a fault contained in one motor module can be contained to that motor module and not affect the operation of the other motor module.

Typically, the number of rotor assemblies 250 is equal to the total number of independent stator modules 230, although it should be appreciated that multiple rotor assemblies 250 can be contained in a single stator module 230, or multiple independent stator assemblies/modules 230 could contain a single rotor assembly 250. The rotor assemblies 250 are preferably mounted laterally side-by-side along the longitudinal axis of the main shaft 285 as shown in FIGS. 3-4. One or more bearings 288 support the main shaft 285, and in an embodiment more bearings 288 support main shaft 285 in motor assembly 200 than are contained in and support main shaft 285 in motor assembly 200.

In an embodiment, each individual stator module 230 has one or more cooling inlets 216 (see FIG. 14) positioned at the drive end 286 of the stator module 230 (that is the end closest to output shaft 285 of the electric motor assembly 200) and one or more cooling outlets 218 (see FIG. 14) at the opposite end to the drive end along the main shaft 185 of the electric motor assembly 100. The one or more cooling inlets 216 are connected to channel 217 (see FIG. 14) to direct the fluid 147 to flow through the stator windings 235 as shown in FIGS. 14-15 (see cooling inlets 216, outlets 218, and channels 217). In one or more embodiments, the one or more cooling inlets 216, channels 217, and one or more cooling outlets 118 are configured as described and taught in PCT/AU2018/050553 (WO 2018/218314), the entirety of which is incorporated by reference. The cooling volume between the multiple modules can be physically segregated or common. For example, each inlet 216, outlet 218, and connecting channel 217 can form a single independent cooling path through the multiple stator modules 230 of electric motor assembly 200. In an alternative embodiment, an independent channel 217 (not shown) through each stator windings 235 could be formed in the electric motor assembly 200. That is, one or more inlets 216' could connect one or more channels 217' that traverses a single stator winding 235' and exit the stator winding 235' through one or more outlets 218'; and one or more inlets 216" could connect one or more channels 217" that traverses a different single stator winding 235" and exits the stator winding 235" through one or more outlets 218". The channels could be arranged as separate parallel channels 217', 217" or could be arranged and configured as serial channels 217', 217".

The electric motor assembly 100, 200 preferably receives alternating-current (AC) as its input power, and in a preferred embodiment receives high-voltage, alternating current (HVAC). The electric motor assembly 100, 200 includes in one or more embodiments one or more electric power connector boxes 120, 220 to receive the electrical power. In an embodiment, the electric motor assembly 100 has multiple stator windings 135 associated with stator module 130, and electric motor assembly 200 has multiple stator winding 235 associated with each stator module 230. Stator module 130 and stator windings 135 in one or more embodiments are substantially the same as, if not identical, to stator module 230 and stator windings 235. For ease of explanation, the structure, features, and operation of stator module 130 and stator windings 135 will be described with reference to FIGS. 5-7, but it should be appreciated that the structure, features, and operation of the stator modules 230', 230", stator windings 235', 235" in one or more embodiments are substantially the same as stator 130 and stator windings 135.

Figure 5:
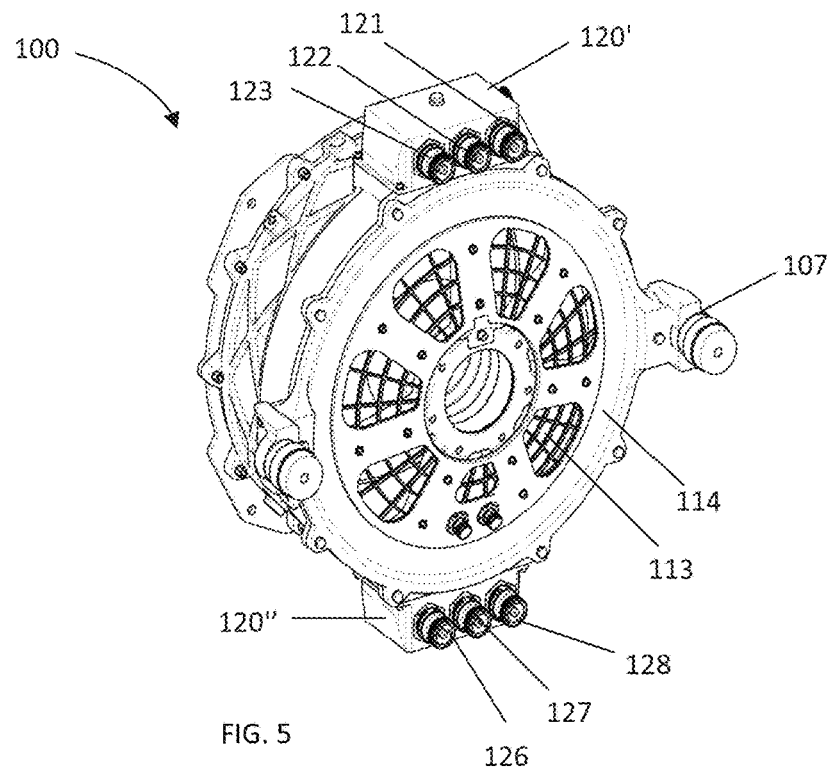
FIG. 5 illustrates a rear perspective view of the motor assembly of FIG. 3.
Figure 6:
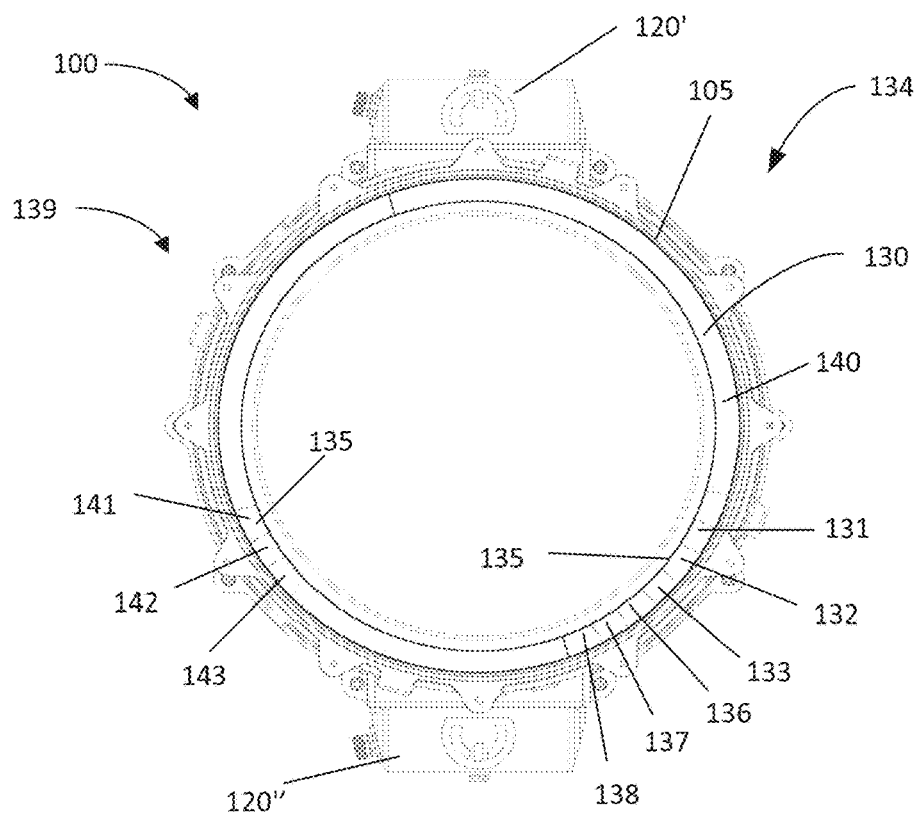
FIG. 6 illustrates a front view of the electric motor assembly of FIG. 3 with the front thrust plate, rotor assembly removed, and the stator assembly simplified for explanatory purposes.

Referring to FIGS. 5-7, the electric motor assembly 100 has at least one electrical connector box 120 to receive alternating-current input power, preferably high-voltage, alternating-current (HVAC). More preferably, the electric motor assembly has one or more electrical connector boxes 120 to receive multi-phase alternating current, and in an aspect multi-phase, HVAC of about 10 to about 850 volts (RMS), more preferably about 10 to about 560 volts RMS of alternating-current. This alternating current is typically about 10 to 700 amperes (RMS), more preferably 10 to 500 Amperes (RMS). Both the supplied RMS voltage and current are dependent on operating speed and commanded torque from the motor (e.g., the operating point of the motor). The supplied voltage is typically Pulse Width Modulated (PWM) voltage from a motor controller, with typical modulation schemes such as Sine PWM (SPWM), Third Harmonic Injection PWM (THPWM or THIPWM) or Space Vector PWM (SVSPM)—schemes well known to a person skilled in the art. In an embodiment, each connector box 120 receives three-phase, alternating current, preferably three-phase HVAC. The alternating-current delivered to the one or more connector boxes 120 is delivered to multiple stator windings 135 configured about the stator core 140. The alternating-current flows through the multiple stator winding 135 and creates an electro-magnetic field which will be used to rotate the one or more rotor assemblies 150 as described below. The stator windings 135 are known in the art and include conductive wire, for example copper wire, typically wrapped in multiple loops/turns to form a coil 148, typically about a core structure or stator tooth 145. A plurality of core structures or stator teeth 145 are attached to or form the stator structure 140. The stator windings 135 create an electro-magnetic field when current runs through the wire/coil 148.

Each stator winding module 130 preferably contains at least one set of multi-phase windings 135, e.g., three-phase stator windings configured about the stator core 140 and arranged so every fourth winding 135 receives the same phase of alternating-current. For example, a first stator winding 131 is arranged on the stator core 140 to receive a first phase of alternating current 121, while a second stator winding 132 is arranged on the stator core 140 adjacent to the first stator winding 131 receives a second phase of alternating current 122 that is phase shifted 120 degrees from the first phase of alternating current 121, and a third stator winding 133 is arranged on the stator core 140 adjacent to the second stator winding 132 receives a third phase of alternating current 123 that is phase shifted 120 degrees from the second phase of alternating current 122. Each of the first windings 131, second windings 132, and third windings 133 are electrically isolated and receive a different phase of alternating-current, preferably a different phase of HVAC. For example, a fourth stator winding 136 is arranged on stator core 140 adjacent third stator winding 133 and is electrically connected in series to the first stator winding 131 and receives first phase alternating-current 121, while a fifth stator core 137 is arranged on stator core 140 adjacent fourth stator winding 136 and is electrically connected in series to second stator winding 132 and receives second phase alternating-current 122, and a sixth stator winding 138 is arranged on stator core 140 adjacent fifth stator winding 137 and is electrically connected in series to the third stator winding 133 and receives third phase alternating-current 123.

In this regard, a first group of multiple stator windings, e.g., 131, 136, are connected in series and receive a first phase of alternating current, preferably first phase HVAC 121, a second group of multiple stator windings, e.g., 132, 137, are connected in series and receive a second phase of alternating current, preferably second phase HVAC 122, and a third group of multiple stator windings, e.g., 133, 138, are connected in series and receive third phase of alternating current, preferably third phase HVAC 123. Additionally, groups of multiple windings can alternatively be connected in parallel to each other, e.g., the first group of multiple windings is connected in parallel with the second group and third group of multiple windings. While the above embodiment has described the use of three-phase stator windings 135, e.g., three groups of multiple stator windings 135, receiving three-phases of alternating-current, it should be appreciated that in one or more embodiments the stator windings 135 could be configured for more or less phases of input alternating-current, for example two or four phases of input current, where in an aspect the degree of phase shift could be altered as per the design configuration.

The stator windings 135 in an embodiment are individually packaged, preferably as modules to provide a greater level of physical insulation and separation between the wire windings 135 and the motor housing 105 and stator core 140 leading to enhanced reliability. Individually packaging each winding 135 also permits easier disassembly for maintenance and replacement in the event of default condition within the stator module 130, for example, in the event of disconnection of a wire or phase input, a short between a stator winding 135 and the stator structure 140 or electrical ground, a short between a stator winding 135 of one phase and the stator winding 135 of another phase, and/or a short between windings turns within the same phase. The individual windings units 135 in an embodiment are bolted to stator core 140 and/or housing 105. The stator windings 135 in an embodiment can be constructed and arranged around the stator core 140 as described and taught in PCT/AU2018/050553 (WO 2018/218314), the entirety of which is incorporated by reference.

In one or more embodiments, each stator module 130 features two or more independent sets of multiphase windings. For example, within a single winding module 130, two (e.g., dual) sets of groups of three-phase stator winding 135 are provided, where first set 134 of three-phase stator windings 135 is independent of the other second set 139 of groups of three-phase stator windings 135. In one or more configurations, separate independent electrical connector boxes 120', 120" are provided and each electrical connector box 120', 120" is independently connected to one set of the stator windings 135. For example, as shown in FIGS. 5-7, electrical connector box 120' is connected to first set 134 of three phase windings 135, and more specifically the first set 134 of stator windings 135 contains a first group of stator windings 135, e.g., windings 131, electrically connected to first phase alternating-current input 121, a second group of stator windings 135, e.g., windings 132, electrically is electrically connected to second phase alternating-current input 122, and a third group of stator windings 135, e.g. windings 133, electrically connected to third phase of alternating current input 123. Electrical connector box 120" in the example is connected to second set 139 of three phase windings 135, and more specifically first phase alternating-current input 126 is electrically connected to respective first group of stator winding 135, e.g., windings 141, second phase alternating-current input 127 is electrically connected to respective second group of stator winding 135, e.g., windings 142, and third phase alternating-current input 128 is electrically connected to respective third group of stator winding 135, e.g., windings 143.

By having two separate, independent sets 134, 139 of stator windings 135 located about the circumference of the stator core 140, a single stator module 130 effectively has two stator elements, e.g., two motor elements, such that operation and rotation of the rotor assembly 150 should continue should one set of the two sets of stator windings 135 fail. That is, should power to one set of the stator windings 135 fail, or should one set of the stator windings 135 fail, the stator module 130 would still produce an electromagnetic field and force its corresponding rotor assembly 150 to rotate so that the electric motor assembly would remain operational.

In an embodiment, as shown in FIG. 6, first set 134 of multiphase stator windings 135, preferably arranged as three phase windings 131, 132, and 133 (also referred to as three phase winding band A), is configured to occupy one-half of the stator core 140, and the second set 139 of the multiphase windings 135, preferably arranged as three phase windings 141, 142, and 143 (also referred to as three phase winding band B), occupies the other half of the stator core 140. In the manner shown in FIG. 6, the two independent sets 134, 139 of the stator windings 135 are physically and electromagnetically separate from each other except along the plane of symmetry between the two halves. The layout and arrangement of stator windings 135 in sets 134, 139 as shown in FIG. 6 maximizes their physical separation while minimizing the mutual magnetic coupling between the two sets 134, 139 of 3-phase windings. In the event one set of the stator windings 135 should fail, whether for lack of power or some other fault, the other set of stator windings 135 should remain operational—an electromagnetic force will be created and applied to the rotor assembly 150 to rotate main shaft 185 and still produce torque. In another embodiment, the two sets 134, 139 of three phase windings 135 are interleaved in a repeating pattern around the circumference of the stator core 140. While this second embodiment does not preserve the large amount of physical and electromagnetic separation as the first embodiment, it provides continued operation of the motor module 125 without the resulting unbalanced force being exerted upon the rotor assembly 150 by the corresponding stator module 130. While the example electric motor assembly 100 is illustrated with dual, three phase stator windings, e.g., two sets of three groups of three-phase stator windings, it should be appreciated that more than two independent sets of stator windings 135, and further that single phase stator windings, two phase stator windings, or greater than three phase stator windings and input power, can be utilized.

In an embodiment of the example electric motor assembly 200 of FIGS. 3-4, each motor module 225 has two electric power connector boxes 120 that each receive three phases of power input, e.g., three-phase, alternating-current power inputs. The modular electric motor assembly 200 in the embodiment having two motor modules 225 uses a four (quad), three-phase architecture which provides four independent sets of stator windings 135 preferably with four independent power inputs from, for example, four electrical connector boxes 120 to provide redundancy and graceful degradation should a fault occur. It should be appreciated that each stator module 130 can have more or less sets of separate windings, more or less electric alternating-current phase inputs, and more or less electric power connector boxes.

The rotor assembly 150 in an embodiment as shown in FIGS. 8-10 has a plurality of permanent magnets 160 arranged along the outer circumference 151 of the rotor structure 155 to employ a Halbach array such that the magnetic field 152 of the rotor assembly 150 is reinforced on the working side 153 of rotor assembly 150 and cancelled on the back side 154 of the rotor assembly. By arranging the magnetic poles of the magnets 160 around the circumference 151 of the rotor hub 155 to increase the strength of the magnetic field 152 on the working side 153 of the rotor assembly 150 where the air gap 149 between the rotor assembly 150 and the corresponding stator module 130 is located (see FIG. 7), allows the reduction or removal of the back iron on the back side 154 of the rotor hub 130 that would normally be required to redirect the magnet field, thereby reducing the weight of the rotor assembly 150. In a preferred embodiment the Halbach array is constructed using three (3) magnets 160 per pole as shown in FIGS. 8-10. For example, magnets 162, 164, and 166 form a north pole 161 where magnet 162 is positioned to have its north pole and magnetic flux directed up (toward stator assembly not shown) as shown by arrow 163 while adjacent magnet 164 is angularly positioned to have its north pole and magnetic flux angularly directed toward magnet 162 and up as shown by arrow 165, and while adjacent magnet 166 is angularly positioned to have its north pole and magnetic flux angularly directed toward magnet 162 and up as shown by arrow 167. Similarly, magnets 172, 174, and 176 form a south pole 171 where magnet 172 is positioned to have its south pole 171 and magnetic flux directed down (away from stator assembly not shown) as shown by arrow 173 while adjacent magnet 174 is angularly positioned to have its south pole and magnetic flux directed toward magnet 172 and down as shown by arrow 175 and adjacent magnet 176 is angularly adjusted to have its south pole and magnetic flux directed toward magnet 172 and down as shown by arrow 177. The north poles 161 and south poles 171 formed by the three magnet sets alternate as shown in FIGS. 8-10 around the circumference 151 of the rotor assembly 150.

In a Permanent Magnet Synchronous Machines (PMSM) the poles refer to the number of magnetic poles, e.g., 161, 171 arranged in a circular array around the circumference 151 of the rotor hub 155, where each north pole counts as one pole and each south pole counts as one pole In an embodiment, the number of magnet poles that the rotor assembly 150 forms is an even number between about 20 and 48 poles. In a more specific embodiment, the number of magnetic poles is between about 28 to 36 poles. For example, thirty-two (32) poles means that there are thirty-two (32) alternating north and south poles (each pole in an embodiment formed by three magnets) positioned around the rotor hub 155. It should be appreciated that the number of poles can be more or less, and the number of magnets 160 forming the poles can also be more or less than the three magnets forming the poles in the embodiments of FIGS. 8-10.

As shown in FIG. 9, in one or more embodiments the magnets 160 are provided as thin sheets 169 and a plurality of thin sheets 169 of magnets 160 are glued or laminated together with their poles directed in the same direction to form a plurality of stacks 168 of laminated magnets. The glue laminating the thin sheets 169 of magnets 160 together in their stack 168 configuration in one or more embodiments acts as an insulator, and in an aspect the glue layer preferably is fairly consistent to keep the thin slices or sheets 169 of the magnets 160 separate. The glue in an aspect includes ceramic microspheres to preserve a consistent bond thickness of about 20 to about 100 microns. A plurality of thin sheets 169 of magnets 160 forming the stacks are aligned on the rotor hub 155 as shown so the sheets 169 are aligned along the axis of the main shaft 185, referred to as axially aligned. The plurality of thin sheets 169 of magnets 160 are laminated together to reduce losses due to parasitic eddy currents in the magnetic material. The dimensions of the thin sheets 169 of the magnets 160 in an aspect have a thickness "t" of about 1 mm to about 5 mm, a length "L" of about seven (7) mm to about fourteen (14) mm in the radial direction, and a width "W" of about seven (7) mm to about fourteen (14) mm (see FIG. 8). The magnets 160 are preferably Samarium cobalt alloy or Neodymium-Iron-Boron magnets. The plurality of stacks 168 of magnets 160 are arranged on the circumference 151 of the rotor structure 155 so that three stacks 168 of magnets 160 form each pole and the North/South poles alternate as illustrated in FIG. 8.

In a further preferred embodiment as shown in FIG. 9, the plurality of stacks 168 of magnets 160 are arranged and configured on the circumference 151 of the rotor hub 155 as two rows 178, 179 of magnet stacks 168 that are offset. That is, back row 178 formed of a plurality of magnet stacks 168 are skewed or shifted with respect to front row 179 of magnet stacks 168. Skewing or shifting the rows 178, 179 of magnet stacks 168 with respect to each other reduces detent or cogging torque between the rotor magnets 160 and the stator windings 135. In one or more embodiments, the shift or offset 180 between the rows 178, 179 is between one degree to about 2.5 degrees difference along the circumference 151 of the rotor structure 155. While only two rows 178, 179 of stacks 168 of magnets 160 are shown in FIG. 9 as being offset or skewed it should be appreciated that the rotor assembly 150 could have a single row of stacks 168 of magnets 160, or could have more than two rows of stacks 168 of magnets 160, with one or more rows (or all rows) of stacks 168 of magnets 160 shifted to reduce cogging torque. The number of thin magnets 160 in a stack 168 can vary and will depend upon the thickness "t" of the thin sheets 169, the thickness of the glue layer, and the working length "WL" of the rotor assembly.

The rotor assembly 150 also preferably includes in an embodiment a retention band or sleeve 184 applied over the magnets 160 to facilitate and help retain the magnets 160 on the rotor hub 155 as shown in FIG. 10. In an aspect, the retention band 184 is carbon fiber, or other material so as not to interfere with the magnetic flux of the magnets 160. In one or more embodiments, the bases 170 of the magnets 160 are flat rather than curved to improve ease of assembly and aid in correct placement of the magnet poles. In a further aspect, the sides 181 of the magnets 160 are angled to permit close fitting between adjacent stacks 168 of magnets 160. In one or more aspects the width or working length (WL) of the rotor assembly 150 is between about 80 mm to about 200 mm. The stacks 168 of magnets 160 are about 40 mm to about 100 mm in length and about 7 mm to about 14 mm wide. The diameter 156 of the rotor hub 155 to the outer surface of the magnets 160 is between about 240 mm to about 450 mm. In an embodiment, the rotor hub 155 is a titanium alloy or other non-magnetic material, e.g., carbon-fiber, to avoid interference with the magnetic fields created by the magnets 160.

An electric motor assembly to supply torque is described where in an embodiment the electric motor assembly includes one or more stator modules having a plurality of stator windings, each stator winding configured to receive high-voltage, alternating current; one or more rotor assemblies, each rotor assembly having a hub and plurality of magnets arranged on the hub, the plurality of magnets each having magnetic north and south poles where the plurality of magnets are arranged along an outer periphery of the hub to alternate the magnetic north and south poles; and a main shaft to supply the torque, wherein at least one of the one or more rotor assemblies is configured to rotate the main shaft, and the at least one of the one or more rotor assemblies is associated with, concentrically contained within, and rotatable relative to the one or more stator modules. In one or more embodiments, the plurality of stator windings on at least one of the one or more stator modules are arranged as at least two independent sets of a plurality of stator windings, each independent set of a plurality of stator windings is electrically isolated from the other set of a plurality of stator windings.

The first independent set of a plurality of stator windings in an aspect is spaced and separated from the second independent set of a plurality of stator windings to resist magnetic coupling between the sets of stator windings. The first set of independent stator windings in an embodiment has at least two groups of a plurality of stator windings, each of the plurality of windings in each group is electrically connected together and electrically isolated from the plurality of windings in the other groups. In a further arrangement, there are two independent sets of a plurality of stator windings in at least one of the one or more stator modules, wherein each independent set of stator windings has three groups of a plurality of stator windings, each of the plurality of windings in each group of each independent set of stator is electrically connected together and electrically isolated from each of the plurality of windings in each other group of stator windings. The electric motor assembly is configured in one or more aspects to receive two independent supplies of three phase, high-voltage, alternating current, wherein the first independent supply of three phase, high-voltage, alternating current is configured to supply the first independent set of three groups of a plurality of stator windings, each of the three groups of stator windings in the first set configured to receive a different phase of the first independent supply of three-phase, high-voltage alternating current, and wherein the second independent supply of three-phase, high-voltage, alternating current is configured to supply the second independent set of three groups of a plurality of stator windings, each of the three groups of stator windings in the second set configured to receive a different phase of the second independent supply of three-phase, high-voltage alternating current. In an embodiment, the first independent set of a plurality of stator windings is positioned on a first half of the at least one of the one or more stator modules and the second independent set of a plurality of stator windings is positioned on the second half of the at least one of the one or more stator modules wherein the first half is spaced from and separated from the second half to resist magnetic coupling between the first and second independent sets of stator windings.

In further embodiments, each of the magnetic poles on at least one of the rotor assemblies comprises at least three magnets with their magnetic poles oriented in different directions. The plurality of magnets are also positioned along the periphery of the rotor hub in at least one of the one or more rotor assemblies where in an aspect the magnets are configured as at least two rows of a plurality of magnets where at least one of the two rows is offset with respect to another of the rows. The plurality of magnets in an arrangement comprise multiple sheets of magnets glued together with their magnetic poles identically aligned to form a plurality of magnet stacks. Each of the magnetic poles on at least one of the rotor assemblies in an embodiment comprise at least three magnet stacks with the magnetic poles of each of the stacks oriented in a different direction. The plurality of magnet stacks are configured as at least two rows of stacks of magnets according to an embodiment where at least one of the at least two rows is offset with respect to another of the rows. According to an aspect, a retention band overlays the permanent magnets on at least one of the one or more rotor assemblies to facilitate retention of the permanent magnets.

In a further embodiment, The electric motor assembly has a modular motor, the modular motor having at least two stator modules; at least two rotor assemblies, wherein the at least two rotor assemblies are mounted on the main shaft laterally side-by-side along a longitudinal axis of the main shaft, and each rotor assembly is associated with and concentrically contained within one of the at least two stator modules, each rotor assembly being rotatable relative to its associated stator module. In an aspect, at least two electric power connector boxes wherein each electric power connector box has a plurality of connections to receive an independent supply of multiphase alternating-current, wherein each of the plurality of connections is connected to a separate group of a plurality of stator windings connected in series. Further, according to one or more embodiments, at least one of the one or more stator modules, preferably all the stator modules, is configured to receive liquid coolant to cool the stator windings.

The disclosed electric motor assembly preferably is a Fractional Slot Concentrated Winding motor where the number of slots per pole per phase (ssp) is preferably ⅖ or ½, or alternatively ⅜ or 3/7, where an example is a motor assembly with 30 poles and 36 slots, or 32 poles and 48 slots. The poles refer to the alternating magnetic poles 161, 171 referred to above, while slots refer to the number of spaces in between stator teeth 145 where the copper windings 135 are placed. The electric motor assembly has a range of sizes and in an embodiment has a working or airgap diameter, which refers to the air gap 149 between the stator windings 135 and the rotor assembly 150, between about 240 mm and 450 mm, with the rotor assembly 150 per motor module 125 having a working length "WL" of about 80 mm to about 200 mm. The electric motor assembly provides full torque even at low RPM. An example motor assembly with two motor modules 125, e.g., stator/rotor assemblies, provides torque of about 500 Nm to 3600 Nm even at low RPM, e.g. about 1000 to about 3000 RPM, and without a reduction gearbox, and with very little to no impact by altitude. The electric motor assembly and the rotational speed of the main shaft can be controlled so that there can be a direct drive connection of the motor's main shaft to the propulsor without the need for a reduction gearbox. In this regard, the main shaft of the electric motor typically rotates at approximately 1200 to approximately 2600 rpm, and in one or more embodiments can operate under conditions where the main shaft will rotate at speeds between approximately 1200 to approximately 3000 rpm. The electric motor assembly uses liquid cooling and achieves high thermal performance and efficiency. In an embodiment of the modular electric motor, typical rated parameters are shown in Table 1.

TABLE 1

| Motor Specifications: | |
|---|---|
| Continuous Torque | 2814-3200 Nm/2075-2360 ft.lbs |
| Continuous Power | 560-760 kW/750-1033 shp |
| Base Speed | 1900 RPM |
| Maximum Speed | 3000 RPM |
| DC Link Voltage (nominal) | 540 V |
| DC Link Voltage range | 400-800 V |
| Number of 3 Phase Windings | 4 |
| Efficiency | >93% |
| Weight | 100-140 kg/220-309 lbs |

The role of a propeller or propulsor governor is to regulate the speed of a variable pitch propeller. The propeller governor connects to the motor or engine via an interface for torque transfer and fluid connections. A propulsor speed reference also is supplied to the propulsor governor and based upon the speed reference the propulsor governor regulates the pitch of the propulsor elements, e.g., the propeller blades. Action by a governor interface receiving inputs from the propulsor governor adjusts the propeller blades to increase or decrease the pitch of the propeller thereby adjusting the "bite" into the incoming air flow and the load on the motor.

Both electric motor assemblies 100, 200 support the addition and integration of an accessory gearbox having a governor interface system to drive a propulsor governor to adjust the pitch of the propulsor elements. In an embodiment the accessory gearbox has a governor interface system integrated with the electric motor assembly to drive a hydro-mechanical propeller governor to adjustably provide and vary hydraulic fluid pressure to the propulsor to adjust the pitch of the propulsor elements (e.g., the propeller blades), provide a speed reference from the main shaft of the electric motor assembly to the propulsor governor, and regulate the speed of the main shaft of the electric motor assembly. The accessory gearbox and integrated governor interface system in one or more embodiments can be mounted at the front or rear of the electric motor assembly.

Figure 11:
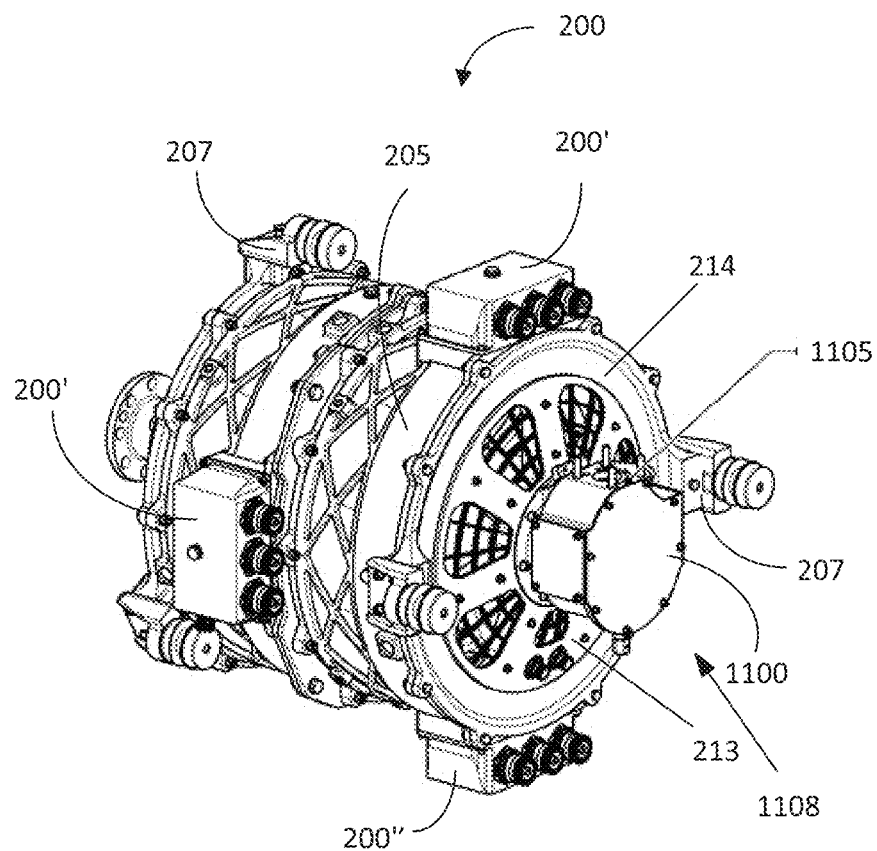
FIG. 11 illustrates a rear perspective view of an example of an embodiment of the electric motor assembly of FIG. 3 integrated with an embodiment of an accessory gearbox having a governor interface system.

FIG. 11 illustrates an accessory gearbox 1100 having a governor interface system 1108 integrated with electric motor assembly 200. The accessory gear box 1100 having a governor interface system 1108 in FIG. 11 is installed at the rear of the electric motor assembly 200 and attaches to the rear of the main shaft. While FIG. 11 illustrates electric motor assembly 200 integrated with accessory gearbox 1100 shown in the form of integrated governor interface system 1108, it should be appreciated that accessory gearbox 1100, in the form of governor interface system 1108, can be integrated and used with electric motor assembly 100 or other electric motor assemblies. The top 1105 of the accessory gearbox 1100 configured as governor interface system 1108 connects to propulsor governors known in the aviation industry to adjust the pitch of propulsor elements, e.g., propeller blades, such as for example, using a standard AS20010 Rev. A governor interface.

Figure 12:
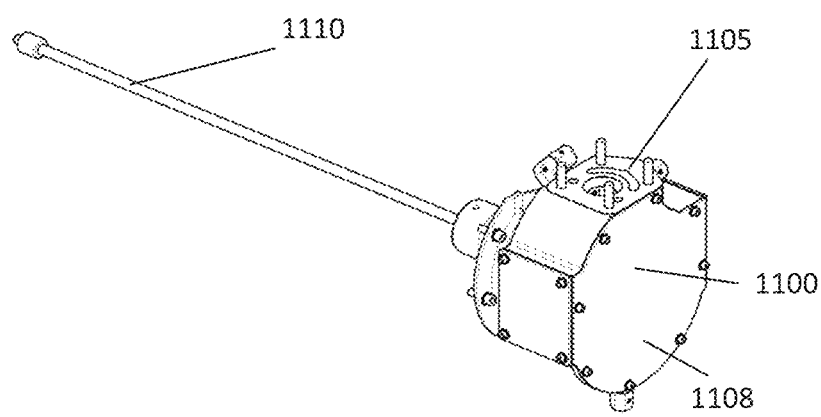
FIG. 12 illustrates a top perspective view of an embodiment of an accessory gearbox having an integrated governor interface system of FIG. 11 for use with an electric motor assembly.
Figure 13:
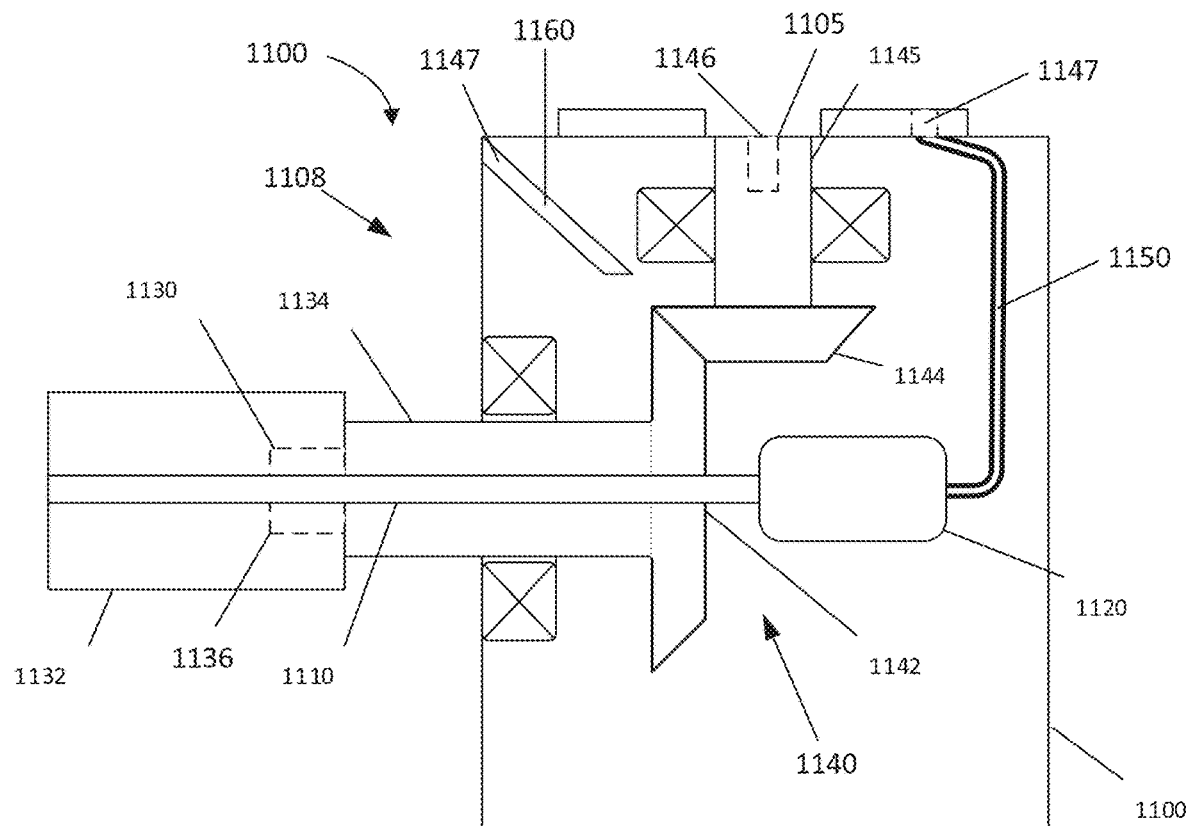
FIG. 13 illustrates a diagrammatic cross-sectional view of the accessory gearbox with integrated governor interface system of FIG. 12.

The accessory gearbox 1100 having governor interface system 1108 as shown in FIGS. 12-13 has a high pressure tube 1110 that extends through a central bore in the main shaft of the electric motor assembly for transferring hydraulic fluid 1147 from the accessory gearbox 1100/governor interface system 1108 to the propulsor control element. High pressure fluid 1147 contained within or fed to a propulsor governor passes from the propulsor governor into the governor interface system 1108 and through one or more conduits 1150 to stationary-to-rotating fluid interface 1120, to high pressure tube 1110 where the fluid 1147 traverses through the electric motor assembly, to the propulsor control element, where in an embodiment it acts upon a piston to change the pitch of the propeller blades. The propulsor governor regulates and adjusts the pressure of the hydraulic fluid 1147 which is pumped through the governor interface system 1108 to adjust, in an embodiment, the positioning of a piston to control the pitch of the propeller blades.

To regulate and adjust the pressure of the hydraulic fluid 1147, the propulsor governor is supplied a speed reference of the electric motor assembly via the governor interface system 1108. The accessory gearbox 1100 in an embodiment includes a splined interface 1130 to mate with the main shaft of the electric motor assembly. In an embodiment the splined interface 1130 includes a coupling 1132 to rotatably attach a shaft 1134 of the accessory gearbox 1100 to the main shaft of the electric motor assembly that in an aspect includes splines or teeth 1136 to mate with corresponding splines or teeth on the main shaft of the electric motor assembly to transfer torque and to rotate shaft 1134. The shaft 1134 of accessory gearbox 1100 includes a bevel gear set 1140 that provides a mechanical speed reference to the propulsor governor. The bevel gear set 1140 in an embodiment includes a drive bevel gear 1142 that interfaces, mates with, and drives a second bevel gear 1144 to rotate shaft 1145 and associated reference gear set 1146. Reference gear set 1146 can be a single gear or set of gears that is mounted on, connected to, incorporated within, or otherwise associated with shaft 1145 that is rotated by bevel gears 1142, 1144 where reference gear set 1146 provides the motor speed reference to the propulsor governor. The ratio of the bevel gear set 1140 (bevel gears 1142, 1144) in one or more embodiments is between 1:1 to 2.5:1, although other ratios are contemplated.

Additionally, and/or alternatively, in an embodiment, the hydraulic fluid 1147 used in the accessory gearbox 1100 configured as integrated governor interface system 1108 is feed through a conduit or inlet 1160 for use as a lubricant in the accessory gearbox 1100 and integrated governor interface system 1108. For example, the bevel gears (e.g., gear set 1140), bearings, and other moving components in accessory gearbox 1100 can receive lubricating fluid 1147. Furthermore, in one or more aspects, the same lubricating fluid 1147 used to lubricate the accessory gearbox 1100 can also be feed to the electric motor assembly and used as a lubricant, for example to lubricate the bearings, or other moving parts, in the electric motor assembly.

In one or more embodiments the hydraulic fluid 1147 used by the governor and governor interface system 1108 is the same fluid 147 used to cool the electric motor assembly. For example, the same turbine oil to cool the electric motor, e.g., the coolant that traverses channels 117 in the stator windings 135, is used by the governor and the accessory gearbox 1100 integrated as governor interface system 1108 to adjust and control the propulsor element. In an aspect, the fluid 147 used to cool the electric motor assembly is the same hydraulic fluid 1147 used in the accessory gearbox 1100 configured as governor interface system 1108 and is supplied from the same reservoir. Additionally and/or alternatively, the fluid 147 used to cool the electric motor assembly is used to lubricate the accessory gearbox (e.g., the governor interface system 1108), is used to lubricate the electric motor assembly as discussed above, and is used as the hydraulic fluid 1147 to adjust the pitch of the propulsor elements. The fluid 147 used to cool the electric motor assembly can in an embodiment be on the same loop or conduit pathway, and in an embodiment use the same reservoir, as the fluid 1147 used in the propulsor governor, the fluid 1147 used to lubricate the accessory gearbox 1100 (e.g., used in governor interface system 1108), and the fluid 1147 used to lubricate the electric motor assembly. Alternatively the fluid conduits for each purpose can be separate, independent loops, or other configurations that combine conduits can be used, all using in an embodiment the same reservoir and the same or different pumps.

Accessory gearbox 1100 has been described by reference to governor interface system 1108, however, it should be appreciated that accessory gearbox 1100 is used to power one or more auxiliary systems, for example by using reference gear set 1146, or by using additional gear sets driven by bevel gear 1142 and arranged about the housing of the accessory gearbox and/or housing of the electric motor assembly. In this manner, accessory gear box 1100 is configured to drive the one or more pumps to transport the fluid 147, 1147 for the described purposes. For example, the accessory gearbox 1100 is configured to drive one or more pumps used by the propulsor governor to create fluid pressure to adjust the pitch of the propulsor elements, to drive one or more pumps in connection with transporting the cooling fluid 147 through the electric motor assembly, and/or to drive one or more pumps to transport lubricating fluid 1147 to lubricate the accessory gearbox 1108 and/or the electric motor assembly. It should be appreciated that in aspects a single pump can be used for the integrated system, or multiple pumps can be utilized for multiple purposes and in multiple fluid pathways and delivery systems.

FIGS. 14-15 illustrates an example accessory gearbox 1400 that includes governor interface system 1408 integrated into the main structure of the electric motor assembly 1490 where the accessory gearbox 1400 is located at the front drive end 186 of the electric motor assembly 1490. The front-mounted embodiment of accessory gearbox 1400, in this example incorporating front mounted governor interface system 1400, facilitates coupling with the propellers reverse functionality by positioning the governor 1403 where it can connect with the propeller reversing linkage that provides mechanical feedback of the propellers pitch via the "beta" ring. The front mounted accessory gearbox 1400 also facilitates the addition of one or more accessory drive pads 1410 around the front cone (or thrust plate) 1495 of the motor assembly 1490. These accessory drive pads 1410 are used to drive pumps for oil or other hydraulic fluid, vacuum accessories used in aircraft, scavenge pumps, or auxiliary generators, and the like.

The operation of front governor interface system 1408 is similar to the operation of the rear governor interface system 1108 described in FIGS. 11-13. High pressure fluid 1447 passes from the propulsor governor into the governor interface system 1400 through a hydraulic line 1450 and traverses a channel 1460 through the governor interface system 1400 to and through a stationary-to-rotating fluid interface 1420 to high pressure tube 1410. The rotating fluid interface 1420 creates a seal with rotating high pressure tube 1410 and injects the fluid 1447 under pressure through openings 1412 into high pressure tube 1410. The hydraulic fluid 1447 enters high pressure tube 1410 where it acts to change the pitch of the propeller blades. The governor regulates and adjusts the pressure of the hydraulic fluid 1447 to adjust, in an embodiment, the positioning of a piston to control the pitch of the propeller blades.

To regulate and adjust the pressure of the hydraulic fluid 1447 the governor is supplied a speed reference of the electric motor assembly via the governor interface system 1408. The governor interface system 1408 in an embodiment includes a splined interface 1430 to mate with the front drive end 186 of the main shaft of the electric motor assembly 1490. In an embodiment, the splined interface 1430 includes a coupling 1432 to rotatably attach shaft 1434 of the governor interface system 1408 to the main shaft of the electric motor assembly that in an aspect includes splines or teeth 1436 to mate with corresponding splines or teeth on the main shaft of the electric motor assembly to transfer torque and rotation to shaft 1434. The shaft 1434 of governor interface system 1408 includes a bevel gear set 1440 that provides a mechanical speed reference to the propulsor governor. The bevel gear set 1440 in an embodiment includes a drive bevel gear 1442 that interfaces, mates with, and drives a second bevel gear 1444 that rotates shaft 1445 and associated reference gear set 1446. Reference gear set 1446, which can be a single gear or multiple gears, is mounted on, connected to, incorporated within, or otherwise associated with shaft 1445 that is rotated by bevel gears 1442, 1444 where reference gear set 1446 provides the motor speed reference to the propulsor governor. The ratio of the bevel gear set 1440 (bevel gears 1442, 1444) in one or more embodiments is between 1:1 to 2.5:1, although other ratios are contemplated.

Additionally, and/or alternatively, in an embodiment, the hydraulic fluid 1447 used in the accessory gearbox 1400 configured as integrated governor interface system 1408 is feed through a conduit or inlet 1460 for use a lubricant in the accessory gearbox 1400 and integrated governor interface system 1408. For example, the bevel gears (e.g., gear set 1140), bearings, and other moving components in accessory gearbox 1400 can receive lubricating fluid 1447. Furthermore, in one or more aspects, the same lubricating fluid 1447 used to lubricate the accessory gearbox 1400 can also be feed to the electric motor assembly and used as a lubricant, for example to lubricate the bearings, or other moving parts, in the electric motor assembly.

Accessory gearbox 1400 has been described by reference to governor interface system 1408, however, it should be appreciated that accessory gearbox 1400 is used to power one or more auxiliary systems, for example, by using reference gear set 1446, or by using additional gear sets driven by bevel gear 1442 and arranged about the housing of the accessory gearbox and/or housing of the electric motor assembly. In this manner, accessory drive pads 1410, which are used to power other auxiliary systems, in an embodiment, obtain power from drive bevel gear 1442 mounted on shaft 1434 in a manner similar to governor interface system 1410. Drive bevel gear 1442 would mate with and drive a second bevel gear mounted on a drive shaft to rotate the drive shaft. The drive shaft can have, for example, a pinion or spline gear or other mechanism to transfer rotational energy, associated with rotating drive shaft to transfer energy to the accessory or auxillary device that is to be powered. The drive shaft would provide rotational power and energy to any accessories, e.g., pumps or the like. For example accessory gear box 1400 is configured to drive the one or more pumps from accessory drive pads 1410 configured about the housing to transport the fluid 147, 1147 for the described purposes. For example, the accessory gearbox 1400 is configured to drive one or more pumps used by the propulsor governor to create fluid pressure to adjust the pitch of the propulsor elements, to drive one or more pumps in connection with transporting the cooling fluid 147 through the electric motor assembly, and/or to drive one or more pumps to transport lubricating fluid 1447 to lubricate the accessory gearbox 1408 and/or the electric motor assembly. It should be appreciated that in aspects a single pump can be used for the integrated system, or multiple pumps can be utilized for multiple purposes and/or in multiple fluid pathways and delivery systems.

In one or more embodiments, the hydraulic fluid 1447 used by the governor and governor interface assembly 1400 is the same fluid 147 used to cool the electric motor assembly 1490. For example, the same fluid 147, e.g., turbine oil, to cool the electric motor assembly, e.g., the coolant 147 that enters coolant inlet(s) 116 and traverses channels 117 in the stator windings 135 and exits coolant outlet(s) 118 (see FIG. 7), is used by the governor and governor interface system 1408 as the fluid 1447 used in hydraulic line 1450, channel 1455, through stationary-to-rotating fluid interface 1420, and in tube 1410 to adjust and control the propulsor element. In an aspect the fluid 147 is used to cool the electric motor assembly is pumped back to a common reservoir that also supplies the hydraulic fluid 1447 used in the governor and governor interface system 1409. Additionally and/or alternatively, the fluid 147 used to cool the electric motor assembly is used to lubricate the accessory gearbox (e.g., the governor interface system 1408), is used to lubricate the electric motor assembly as discussed above, and/or is used as the hydraulic fluid 1447 to adjust the pitch of the propulsor elements. The fluid 147 used to cool the electric motor assembly can in an embodiment be on the same loop or conduit pathway, and in an embodiment use the same reservoir, as the fluid 1447 used in the propulsor governor, the fluid 1447 used to lubricate the accessory gearbox 1400 (e.g., used in governor interface system 1408), and the fluid 1447 used to lubricate the electric motor assembly. Alternatively the fluid conduits for each purpose can be separate, independent loops, or other configurations that combine conduits can be used, all using in an embodiment the same reservoir and the same or different pumps.

The disclosed electric motor assemblies in an embodiment further include an accessory gear box, the accessory gear box configured to receive torque from the main shaft of the electric motor assembly to drive at least one of a governor interface system, a pump, auxiliary systems, and combinations thereof. The accessory gear box is configured in an aspect to drive a governor interface system wherein the governor interface system receives a speed reference from the main shaft by a gearbox assembly and wherein the governor interface system uses a hydraulic fluid to adjust a propulsor element and feed the same hydraulic fluid to the governor assembly as a lubricant. The same hydraulic fluid used for the governor interface assembly in an embodiment is fed to the electric motor assembly as a lubricant. An electric motor assembly integrated with an accessory gear box configured to receive torque from the main shaft of the electric motor assembly to drive at least a governor interface system is disclosed wherein the governor interface system receives a speed reference from the main shaft by a gearbox assembly and wherein the governor interface system uses a hydraulic fluid to adjust a propulsor element and feeds the same hydraulic fluid to the governor interface system as a lubricant, where the electric motor assembly is further configured in an aspect to receive as a liquid coolant to flow through the stator windings in the electric motor assembly the same hydraulic fluid fed to the governor interface system as a lubricant.

With respect to the above description, it is to be realized that the dimensional relationship for the parts of the system includes variations in size, materials, shape, form, function and the manner of operation as would be known to one skilled in the art, and all equivalent relationships to those illustrated in the drawings and described in the specification are intended to be encompassed by the invention.

In the claims, the term "comprises/comprising" does not exclude the presence of other elements, features, or steps. Furthermore, although individually listed, a plurality of means, elements, or method steps may be implemented by, e.g., a single unit, element, or piece. Additionally, although individual features may be included in different claims, these may advantageously be combined, and their inclusion individually in different claims does not imply that a combination of features is not feasible and/or advantageous. In addition, singular references do not exclude a plurality. The terms "a", "an", "first", "second", etc., do not preclude a plurality. Reference signs or characters in the disclosure and/or claims are provided merely as a clarifying example and shall not be construed as limiting the scope of the claims in any way.

Those skilled in the art will recognize that the disclosed and illustrated electric motor assembly has many applications, may be implemented in various manners and, as such is not to be limited by the foregoing embodiments and examples, but it is intended to cover modifications within the spirit and scope of the invention. For example, use of electric motor assembly in helicopters or other mobile vehicles is contemplated. IN addition, the electric motor assembly can be used with or without the disclosed integrated governor assemblies, or different governor assemblies. While fundamental features of the invention have been shown and described in exemplary embodiments, it will be understood that omissions, substitutions, and changes in the form and details of the disclosed embodiments of the electric motor assembly and/or governor interface assembly may be made by those skilled in the art without departing from the spirit of the invention. Any number of the features of the different embodiments described herein may be combined into a single embodiment and/or the locations of particular elements, for example, the shaft bearings, motor mounts, electric power connector boxes, coolant inlets, coolant outlets, coolant channels, etc., may be altered.

Alternate embodiments are possible that have features in addition to those described herein or may have less than all the features described. Functionality may also be, in whole or in part, distributed among multiple components, in manners now known or to become known. The discussion of any embodiment is meant only to be explanatory and is not intended to suggest that the scope of the disclosure, including the claims, is limited to these embodiments. In other words, while illustrative embodiments of the disclosure have been described in detail herein, it is to be understood that the inventive concepts may be otherwise variously embodied and employed, and that the appended claims are intended to be construed to include such variations, except as limited by the prior art.

We claim:

1. An electric motor assembly to supply torque, the assembly comprising:
    an electric motor comprising:
        one or more stator modules having a plurality of stator windings, each stator winding comprising a conductive wire having multiple loops to form a coil and configured to receive high-voltage, alternating current;
        one or more rotor assemblies, each rotor assembly having a hub and plurality of magnets arranged on the hub, the plurality of magnets each having magnetic north and south poles where the plurality of magnets are arranged along an outer periphery of the hub to alternate the magnetic north and south poles;
        a main shaft to supply the torque, wherein at least one of the one or more rotor assemblies is configured to rotate the main shaft, and the at least one of the one or more rotor assemblies is associated with, concentrically contained within, and rotatable relative to the one or more stator modules; and
        a cooling system comprising only a single coolant fluid loop having only a single coolant fluid that comprises oil to cool the electric motor, the single coolant fluid loop comprising at least one longitudinal channel formed in between at least one pair of conductive wire adjacent loops of the multiple loops forming the coil of a stator winding and configured to extend in the direction of a longitudinal rotational axis of the main shaft and in the direction of a longitudinal length of the stator winding, the at least one longitudinal channel configured to direct the single coolant fluid to flow through the at least one longitudinal channel of the stator winding and in direct contact with the adjacent conductive wire loops forming the at least one longitudinal channel in the coil of the stator winding, and
        an integrated accessory gearbox configured to receive torque from the main shaft of the electric motor to drive a governor interface system, wherein the accessory gearbox includes one or more gears rotated by the main shaft and a fluid lubricant applied to the one or more gears in the accessory gearbox and wherein the governor interface system receives a speed reference from the main shaft and uses a hydraulic fluid to adjust a pitch of a propulsor element of an aircraft and wherein the same fluid that is used as the fluid lubricant to lubricate the one or more gears in the accessory gearbox is used as the hydraulic fluid in the governor interface system to adjust the pitch of the propulsor element,
        wherein the same fluid used by the accessory gearbox as the fluid lubricant and used as the hydraulic fluid to adjust the pitch of the propulsor element is also used as the single coolant fluid to flow through the at least one longitudinal channel and in direct contact with the adjacent conductive wire loops forming the at least one longitudinal channel in the coil of the stator winding in the electric motor to cool the electric motor.

2. The electric motor assembly of claim 1, wherein the plurality of stator windings on at least one of the one or more stator modules are arranged as at least two independent sets of a plurality of stator windings, each independent set of the plurality of stator windings are electrically isolated from the other set of the plurality of stator windings.

3. The electric motor assembly of claim 2, wherein a first set of independent stator windings comprises at least two groups of a plurality of stator windings, each of the plurality of windings in each group is electrically connected together and electrically isolated from the plurality of windings in the other groups.

4. The electric motor assembly of claim 3, wherein there are two independent sets of a plurality of stator windings in at least one of the one or more stator modules, wherein each independent set of stator windings has three groups of a plurality of stator windings, each of the plurality of windings in each group of each independent set of stator windings is electrically connected together and electrically isolated from each of the plurality of windings in each other group of stator windings.

5. The electric motor assembly of claim 4, wherein the electric motor assembly is configured to receive two independent supplies of three phase, high-voltage, alternating current, and wherein the first independent supply of three phase, high-voltage, alternating current is configured to supply the first independent set of three groups of a plurality of stator windings, each of the three groups of stator windings in the first set configured to receive a different phase of the first independent supply of three-phase, high-voltage alternating current, and wherein the second independent supply of three-phase, high-voltage, alternating current is configured to supply the second independent set of three groups of a plurality of stator windings, each of the three groups of stator windings in the second set configured to receive a different phase of the second independent supply of three-phase, high-voltage alternating current.

6. The electric motor assembly of claim 5, wherein the first independent set of a plurality of stator windings is positioned on a first half of the at least one of the one or more stator modules and the second independent set of a plurality of stator windings is positioned on the second half of the at least one of the one or more stator modules wherein the first half is spaced from and separated from the second half to resist magnetic coupling between the first and second independent sets of stator windings.

7. The electric motor assembly of claim 1, wherein each of the magnetic poles on at least one of the rotor assemblies comprises at least three magnets with each of their magnetic poles oriented in different directions.

8. The electric motor assembly of claim 1, wherein the plurality of magnets positioned along the periphery of the rotor hub in at least one of the one or more rotor assemblies are configured as at least two rows of a plurality of magnets where at least one of the two rows is offset with respect to another of the rows.

9. The electric motor assembly of claim 1, wherein the plurality of magnets comprise multiple sheets of magnets glued together with their magnetic poles identically aligned to form a plurality of magnet stacks.

10. The electric motor assembly of claim 9, wherein each of the magnetic poles on at least one of the rotor assemblies comprise at least three magnet stacks with the magnetic poles of each of the at least three magnet stacks oriented in a different direction.

11. The electric motor assembly of claim 9, wherein the plurality of magnet stacks are configured as at least two rows of stacks of magnets where at least one of the at least two rows is offset with respect to another of the rows.

12. The electric motor assembly of claim 1, wherein a retention band overlays the permanent magnets on at least one of the one or more rotor assemblies to facilitate retention of the permanent magnets.

13. The electric motor assembly of claim 1, wherein the electric motor assembly comprises a modular motor, the modular motor comprising:
at least two stator modules;
at least two rotor assemblies,
wherein the at least two rotor assemblies are mounted on the main shaft laterally side-by-side and co-axially along a longitudinal axis of the main shaft, and each rotor assembly is associated with and concentrically contained within one of the at least two stator modules, each rotor assembly being rotatable relative to its associated stator module.

14. The electric motor assembly of claim 1, further comprising at least two electric power connector boxes wherein each electric power connector box has a plurality of connections to receive an independent supply of multiphase alternating-current, wherein each of the plurality of connections is connected to a separate group of a plurality of stator windings connected in series.

15. The electric motor assembly of claim 1, wherein the same fluid used as a lubricant for the accessory gearbox is used as a lubricant for one or more main shaft bearings in the electric motor assembly.

16. The electric motor assembly of claim 1, wherein the same hydraulic fluid used to adjust the pitch of the propulsor element is fed to the governor interface system as a lubricant.

17. The electric motor assembly of claim 1, wherein the at least one or more stator modules and the at least one or more rotor assemblies are dimensioned and configured to provide torque at the main shaft as high as 3600 Nm at about 1000 to about 3000 revolutions per minute (RPM) without a reduction gearbox.

18. The electric motor assembly of claim 2, wherein a first independent set of a plurality of stator windings is spaced and separated from a second independent set of a plurality of stator windings to resist magnetic coupling between the two independent sets of stator windings.

19. The electric motor assembly of claim 1, wherein the same fluid used as a lubricant for the accessory gearbox is used as a lubricant for one or more main shaft bearings in the electric motor assembly.

20. The electric motor assembly of claim 1, wherein the single coolant fluid is a liquid and the accessory gearbox also drives at least one pump to pump the fluid used as the lubricant in the accessory gearbox, the hydraulic fluid used in the governor interface system, and the coolant fluid that flows through the at least one longitudinal channel in the stator winding.

21. The electric motor assembly of claim 1 wherein the electric motor assembly further comprises a common reservoir to hold the fluid used as the lubricant in the accessory gearbox, the hydraulic fluid used in the governor interface system, and the coolant fluid that is directed to flow through the at least one longitudinal channel in the stator winding.

22. The electric motor assembly of claim 1, wherein each stator winding of the plurality of stator windings are configured to receive alternating current of about 400 to about 850 volts and about 10 to about 700 amperes.

23. The electric motor assembly of claim 1, wherein the cooling system further comprises an inlet for the coolant fluid, a plurality of the longitudinal channels for the coolant fluid to flow in communication with the inlet, and an outlet for the coolant fluid in flow communication with the plurality of longitudinal channels.

24. The electric motor assembly of claim 9, wherein each sheet of magnet has a thickness of between about 1 mm and about 5 mm, a length of about 7 mm to about 14 mm, and a width of about 7 mm to about 14 mm.

25. The electric motor assembly of claim 1, wherein the plurality of magnets are permanent magnets arranged to employ a Halbach array and wherein the number of poles is an even number between 20 and 48.

26. The electric motor assembly of claim 1, further comprising one or more thrust plates and wherein the main shaft of the electric motor is adapted to directly rotate the propulsor of the aircraft without a main gearbox.

27. The electric motor assembly of claim 1, wherein the single coolant fluid is a liquid.

28. The electric motor assembly of claim 1, wherein the single coolant fluid comprises turbine oil.

29. The electric motor assembly of claim 1, further comprising an auxiliary system wherein the auxiliary system drives an auxiliary load different than a main load driven by the electric motor.

30. The electric motor assembly of claim 1, wherein the cooling system comprises a plurality of the longitudinal channels formed in between a plurality of pairs of adjacent loops of the coil of at least one of the plurality of stator windings and extending in the direction of the main shaft, the coolant fluid configured to flow within the plurality of the longitudinal channels.

31. The electric motor assembly of claim 1, wherein the stator windings are individually packaged as winding modules to permit replacement.

32. The electric motor assembly of claim 31, wherein the individual winding modules are attached to at least one of a position group consisting of: a stator core, an electric motor housing, and combinations thereof.

33. The electric motor assembly of claim 1, wherein the conductive wire comprises an outer insulator and the single coolant fluid is configured to flow through and in direct contact with at least a portion of the outer insulator.

* * * * *